United States Patent
Bonne et al.

(10) Patent No.: US 7,222,639 B2
(45) Date of Patent: May 29, 2007

(54) ELECTROSTATICALLY ACTUATED GAS VALVE

(75) Inventors: Ulrich Bonne, Hopkins, MN (US);
Cleopatra Cabuz, Eden Prairie, MN (US); Eugen I. Cabuz, Eden Prairie, MN (US); Stephen J. Kemp, Eagan, MN (US); John T. Adams, Aran (CH); Tzu-Yu Wang, Maple Grove, MN (US); Sybrandus B. V. Munsterhuis, GP Dalen (NL); Gerrit J. Baarda, Emmen (NL)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 11/025,758

(22) Filed: Dec. 29, 2004

(65) Prior Publication Data

US 2006/0137749 A1    Jun. 29, 2006

(51) Int. Cl.
*G05D 16/06* (2006.01)
(52) U.S. Cl. .................. 137/613; 137/487.5; 251/30.01
(58) Field of Classification Search .......... 251/129.01, 251/331, 30.01, 30.02; 137/487.5, 485, 613
See application file for complete search history.

(56) References Cited

U.S. PATENT DOCUMENTS

| | | | |
|---|---|---|---|
| 2,403,692 A | 7/1946 | Tibbetts | |
| 2,975,307 A | 3/1961 | Shroeder et al. | |
| 3,304,446 A | 2/1967 | Martinek et al. | |
| 3,381,623 A | 5/1968 | Elliot | |
| 3,414,010 A | 12/1968 | Sparrow | |
| 3,641,373 A | 2/1972 | Elkuch | |
| 3,769,531 A | 10/1973 | Elkuch | |
| 3,803,424 A | 4/1974 | Smiley et al. | |
| 3,947,644 A | 3/1976 | Uchikawa | |
| 3,993,939 A | 11/1976 | Slavin | |
| 4,115,036 A | 9/1978 | Paterson | |
| 4,140,936 A | 2/1979 | Bullock | |
| 4,197,737 A | 4/1980 | Pittman | |
| 4,360,955 A | 11/1982 | Block | |
| 4,418,886 A | 12/1983 | Holzer | |
| 4,453,169 A | 6/1984 | Martner | |
| 4,478,076 A | 10/1984 | Bohrer | |
| 4,478,077 A | 10/1984 | Bohrer | |
| 4,498,850 A | 2/1985 | Perlov et al. | |
| 4,501,144 A | 2/1985 | Higashi et al. | |
| 4,539,575 A | 9/1985 | Nilsson | |
| 4,576,050 A | 3/1986 | Lambert | |

(Continued)

FOREIGN PATENT DOCUMENTS

DE     19617852     1/1993

(Continued)

OTHER PUBLICATIONS

Athavale et al., "Coupled Electrostatics-Structures-Fluidic Simulations of A Bead Mesopump," Proceedings of the International Mechanical Engineers Congress & Exhibition, Nashville, Tennessee, Oct. 1999.

(Continued)

*Primary Examiner*—Kevin Lee

(57) ABSTRACT

A gas valve body with a first flow chamber and, a second flow chamber including and a main valve positioned in line and between the first flow chamber and the second flow chamber. The main valve can be opened by creating a pressure differential across the main valve. An electrostatically controlled pilot valve is provided for controlling the pressure differential across the main valve for "on-ff" operation. The electrostatically controlled pilot valve may also be operated to "modulate" the pressure differential across the main valve along a range of pressure differential values.

39 Claims, 14 Drawing Sheets

U.S. PATENT DOCUMENTS

| | | |
|---|---|---|
| 4,581,624 A | 4/1986 | O'Connor |
| 4,585,209 A | 4/1986 | Aine et al. |
| 4,619,438 A | 10/1986 | Coffee |
| 4,651,564 A | 3/1987 | Johnson et al. |
| 4,654,546 A | 3/1987 | Kirjavainen |
| 4,722,360 A | 2/1988 | Odajima et al. |
| 4,756,508 A | 7/1988 | Giachino et al. |
| 4,821,999 A | 4/1989 | Ohtaka |
| 4,829,826 A | 5/1989 | Valentin et al. |
| 4,898,200 A | 2/1990 | Odajima et al. |
| 4,911,616 A | 3/1990 | Laumann, Jr. |
| 4,938,742 A | 7/1990 | Smits |
| 4,939,405 A | 7/1990 | Okuyama et al. |
| 5,065,978 A | 11/1991 | Albarda et al. |
| 5,069,419 A | 12/1991 | Jerman |
| 5,078,581 A | 1/1992 | Blum et al. |
| 5,082,242 A | 1/1992 | Bonne et al. |
| 5,085,562 A | 2/1992 | van Lintel |
| 5,096,388 A | 3/1992 | Weinberg |
| 5,129,794 A | 7/1992 | Beatty |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,192,197 A | 3/1993 | Culp |
| 5,206,557 A | 4/1993 | Bobbio |
| 5,219,278 A | 6/1993 | van Lintel |
| 5,224,843 A | 7/1993 | van Lintel |
| 5,244,527 A | 9/1993 | Aoyagi |
| 5,244,537 A | 9/1993 | Ohnstein |
| 5,322,258 A | 6/1994 | Bosch et al. |
| 5,323,999 A | 6/1994 | Bonne et al. |
| 5,325,880 A | 7/1994 | Johnson et al. |
| 5,336,062 A | 8/1994 | Richter |
| 5,368,571 A | 11/1994 | Horres, Jr. |
| 5,441,597 A | 8/1995 | Bonne et al. |
| 5,452,878 A | 9/1995 | Gravesen et al. |
| 5,499,909 A | 3/1996 | Yamada et al. |
| 5,526,172 A | 6/1996 | Kanack |
| 5,529,465 A | 6/1996 | Zengerie et al. |
| 5,536,963 A | 7/1996 | Polla |
| 5,541,465 A | 7/1996 | Higuchi et al. |
| 5,552,654 A | 9/1996 | Konno et al. |
| 5,571,401 A | 11/1996 | Lewis et al. |
| 5,642,015 A | 6/1997 | Whitehead et al. |
| 5,683,159 A | 11/1997 | Johnson |
| 5,696,662 A | 12/1997 | Bauhahn |
| 5,725,363 A | 3/1998 | Bustgens et al. |
| 5,759,014 A | 6/1998 | Van Lintel |
| 5,759,015 A | 6/1998 | Van Lintel et al. |
| 5,792,957 A | 8/1998 | Luder et al. |
| 5,808,205 A | 9/1998 | Romo |
| 5,810,325 A * | 9/1998 | Carr .................... 251/30.02 |
| 5,822,170 A | 10/1998 | Cabuz |
| 5,836,750 A | 11/1998 | Cabuz |
| 5,839,467 A | 11/1998 | Saaski et al. |
| 5,863,708 A | 1/1999 | Zanzucchi et al. |
| 5,901,939 A | 5/1999 | Cabuz et al. |
| 5,911,872 A | 6/1999 | Lewis et al. |
| 5,954,079 A | 9/1999 | Barth et al. |
| 5,971,355 A | 10/1999 | Biegelsen et al. |
| 6,106,245 A | 8/2000 | Cabuz |
| 6,109,889 A | 8/2000 | Zengerie et al. |
| 6,116,863 A | 9/2000 | Ahn et al. |
| 6,122,973 A | 9/2000 | Nomura et al. |
| 6,126,140 A * | 10/2000 | Johnson et al. ........ 251/129.01 |
| 6,151,967 A | 11/2000 | McIntosh et al. |
| 6,167,761 B1 | 1/2001 | Hanzawa et al. |
| 6,179,586 B1 | 1/2001 | Herb et al. |
| 6,182,941 B1 | 2/2001 | Scheurenbrand et al. |
| 6,184,607 B1 | 2/2001 | Cabuz et al. |
| 6,215,221 B1 | 4/2001 | Cabuz et al. |
| 6,240,944 B1 | 6/2001 | Ohnstein et al. |
| 6,288,472 B1 | 9/2001 | Cabuz et al. |
| 6,373,682 B1 | 4/2002 | Goodwin-Johansson |
| 6,418,793 B1 | 7/2002 | Pechoux et al. |
| 6,445,053 B1 | 9/2002 | Cho |
| 6,496,348 B2 | 12/2002 | McIntosh |
| 6,508,528 B2 | 1/2003 | Fuji et al. |
| 6,520,753 B1 | 2/2003 | Grosjean et al. |
| 6,590,267 B1 | 7/2003 | Goodwin-Johansson et al. |
| 6,640,642 B1 | 11/2003 | Onose et al. |
| 6,651,506 B2 | 11/2003 | Lee et al. |
| 2002/0078756 A1 | 6/2002 | Akiyama et al. |
| 2002/0174706 A1 | 11/2002 | Gokhfeld |
| 2003/0005774 A1 | 1/2003 | Suzuki et al. |
| 2003/0019299 A1 | 1/2003 | Horie et al. |
| 2003/0033884 A1 | 2/2003 | Beekhuizen et al. |
| 2003/0189809 A1 | 10/2003 | Ishikura |
| 2003/0205090 A1 | 11/2003 | Jakobsen |
| 2003/0234376 A1 | 12/2003 | Cabuz et al. |
| 2004/0035211 A1 | 2/2004 | Pinto et al. |
| 2004/0055651 A1 | 3/2004 | Baarda |
| 2004/0060360 A1 | 4/2004 | Chen |

FOREIGN PATENT DOCUMENTS

| | | |
|---|---|---|
| DE | 9309770 | 8/1993 |
| EP | 0744821 A2 | 11/1996 |
| EP | 0744821 A3 | 12/1996 |
| EP | 0806216 | 11/1997 |
| JP | 05-219760 | 8/1993 |
| JP | 02-86258 | 10/1995 |
| SU | 744877 | 6/1980 |
| WO | WO 97/29538 | 8/1997 |
| WO | WO 00/28215 | 5/2000 |
| WO | WO 01/33078 | 5/2001 |

OTHER PUBLICATIONS

"Large-Scale Linearization Circuit for Electrostatic Motors" IBM Technical Disclosure Bulletin, U.S. IBM Corporation, vol. 37, No. 10, pp. 563-564, Oct. 1, 1994.

B. Halg, "On a Nonvolatile Memory Cell Based on Micro-Electro-Mechanics", Proceedings of MEMS CH2832-4/90/0000-0172 IEEE (1990), pp. 172-176.

Bertz, Schubert, Werner, "Silicon Grooves With Sidewall Angles Down to 1° made By Dry Etching", pp. 331-339.

Branebjerg, Gravesen, "A New Electrostatic Actuator Providing Improved Stroke Length and Force." Micro Elctro Mechanical Systems '92 (Feb. 4-7, 1992), pp. 6-11.

Bustgens, Bacher, Menz, Schomburg, "Micropump Manufactured by Thermoplastic Molding" MEMS 1994, pp. 18-21.

C. Cabuz et al., "Factors Enhancing the Reliability of Touch-Mode Electrostatic Actuators," Sensors and Actuators 79(2000) pp. 245-250.

C. Cabuz et al., "Mesoscopic Sampler Based on 3D Array of Electrostatically Activated Diaphragms," Proceedings of the 10th Int. Conf. On Solid-State Sensors and Actuators, Transducers'99, Jun. 7-12, 1999, Sendai Japan.

C. Cabuz et al., "The Double Diaphragm Pump," The 14th IEEE International Micro Electro Mechanical Systems conference, MEMS'01, Jan. 21-23, Interlachen, Switzerland.

C. Cabuz, et al., "High Reliability Touch-Mode Electrostatic Actuators", Technical Digest of the Solid State Sensor and Actuator Workshop, Hilton Head, S.C., Jun. 8-11, 1998, pp. 296-299.

C. Cabuz. Tradeoffs in MEMS Material (Invited Paper) Proceedings of the SPIE, vol. 2881, pp. 160-170, Austin, TX., Jul. 1996.

Cabuz, Cleopatra, "Electrical Phenomena at the Interface of Rolling-Contact, Electrostatic Actuators", Nanotribology: Critical Assessment and Research Needs, Kluwer Academic Publisher, pp. 221-236, Copyright 2003, presented at the Nanotribology Workshop, Mar. 13-15, 2000.

Cleo Cabuz, "Dielectric Related Effects in Micromachined Electrostatic Actuators," Annual Report of the IEEE/CEIDP Society, 1999, Annual Meeting, Austin, Texas, Oct. 17-20, 1999.

Jye-Shane Yang et al., "Fluorescent Porous Polymer Films as TNT Chemosensors: Electronic and Structural Effects", *J. Am. Chem. Soc.*, 1998, 120, pp. 11864-11873.

Jye-Shane Yang et al., "Porous Shape Persistent Fluorescent Polymer Films: An Approach to TNT Sensory Materials", *J. Am. Chem. Soc.*, 1998, 120, pp. 5321-5322.

Michael S. Freund et al., "A Chemically Diverse Conducting Polymer-Based 'Electronic Nose'", Proceedings of the National Academy of Sciences of the United States of America, vol. 92, No. 7, Mar. 28, 1995, pp. 2652-2656.

Minami K et al., "Fabrication of Distributed Electrostatic Micro Actuator (DEMA)" Journal of Microelectromechanical Systems, US, IEEE Inc., New York, vol. 2, No. 3, Sep. 1, 1993, pp. 121-127, XP000426532, ISSN: 1057-7157.

Porex Technologies, brochure, dated prior to Jun. 2, 2000, 4 pages.

Shikida, Sato, "Characteristics of an Electrostatically-Driven Gas Valve Under High Pressure Conditions, IEEE 1994, pp. 235-240."

Shikida, Sato, Harada, "Fabrication of An S-Shaped Microactuator," Journal of Microelectromechanical Systems, vol. 6, No. 1 (Mar. 1997), pp. 18-24.

Shikida, Sato, Tanaka, Kawamura, Fujisaki, "Electrostatically Driven Gas Valve With High Conductance", Journal of Microelectromechanical Systems, vol. 3, No. 2 (Jun. 1994), pp. 76-80.

Srinivasan et al., "Self-Assembled Fluorocarbon Films for Enhanced Stiction Reduction", TRANSDUCERS '97, 1997, 1997 International Conference on Solid-State Sensors and Actuators, Chicago, Jun. 16-19, 1997, pp. 1399-1402.

Wagner, Quenzer, Hoerscelmann, Lisec, Juerss, "Bistable Microvalve with Pneumatically Coupled Membranes," 0-7803-2985-6/96, IEEE (1996), pp. 384-388.

Bonne et al. "Actuation-Based Fuel Gas Microsensors", IGT Symposium on "Natural Gas Quality, Energy Measurement, Metering and Utilization Practices", Orlando, FL, 17 pages, Mar. 2001.

Ohnstein et al., "Micromachined Silicon Microvalve", Micro Electromechanical Systems Workshop, Salt Lake City, UT, 4 pages, Feb. 20-22, 1990.

\* cited by examiner

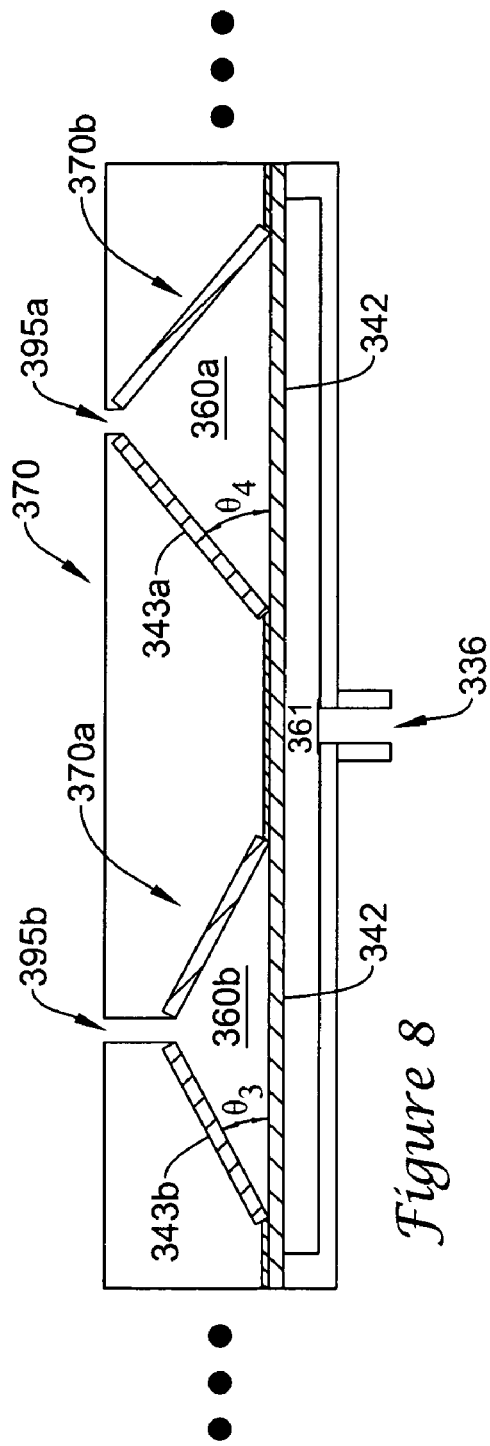
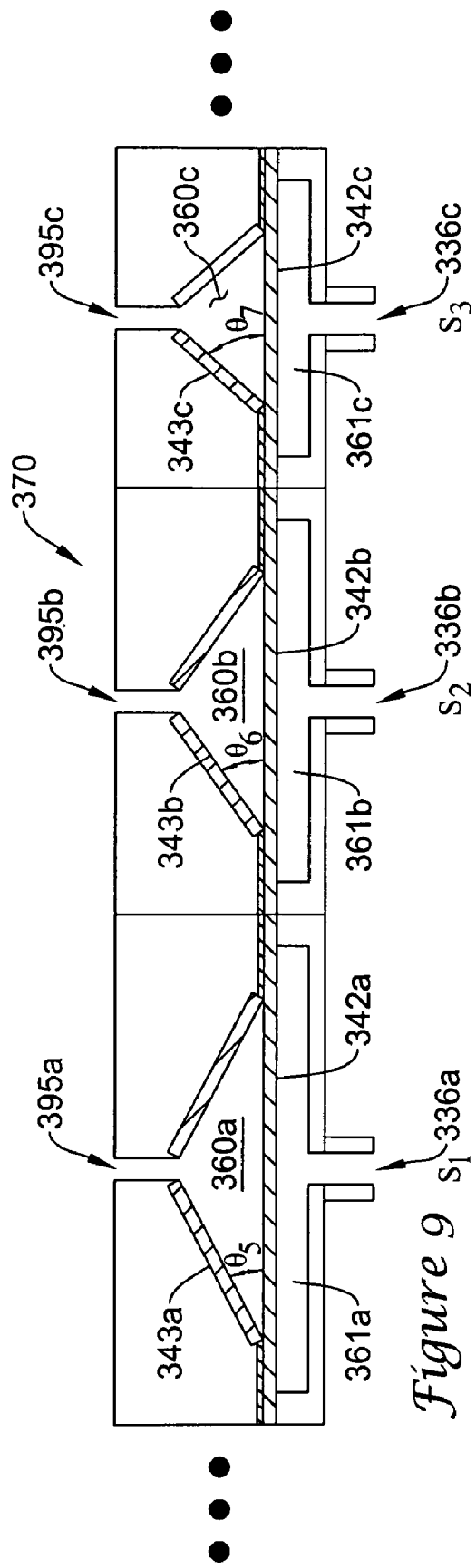
Figure 8
Figure 9

ELECTROSTATICALLY ACTUATED GAS VALVE

BACKGROUND

Gas-powered appliances typically have some control system included for controlling the operation of the appliance. In this context, a gas-powered appliance may be a water heater, a fireplace insert, a furnace, a gas stove, or any other gas-powered appliance. Also in this context, "gas-powered" typically means that natural gas or liquid propane gas is used as a primary fuel source, but it should be recognized that "gas powered" may also include any other suitable fuel source either in a liquid or gaseous state, as desired.

In a fuel-fired, storage-type water heater, for example, a combustion chamber and an air plenum are typically disposed below or near a water tank. A burner element, fuel manifold tube, ignition source, thermocouple, and a pilot tube typically extend into the combustion chamber. When the temperature of the water in the tank falls below a set minimum, fuel is introduced into the combustion chamber through the fuel manifold tube and burner element. This fuel is ignited by the pilot flame or other ignition source, and the flame is maintained around the burner element. Air is drawn into the plenum, sometimes assisted by a blower, and the air mixes with the fuel to support combustion within the combustion chamber. The products of combustion typically flow through a flue or heat exchange tube in the water tank to heat the water by convection and conduction.

Gas valves used in conjunction with gas-powered appliances are known. These gas valves are typically controlled by one or more magnetic or piezoelectric control valves. However, magnetic valves often require a relatively large amount of power to operate, and are bulky. Piezoelectric valves are often relatively expensive, unreliable over an operating temperature from, for example, –30 to 85 degrees Celsius, and often do not provide a desired displacement for optimal performance. Thus, alternative gas valves are sought.

SUMMARY

The present invention generally relates to appliances that include a burner such as a fuel-fired burner and to methods of controlling such appliances.

In one illustrative embodiment, a gas valve includes a first flow chamber, a second flow chamber, and a main valve positioned in line and between the first flow chamber and the second flow chamber. The main valve can be opened by, for example, creating a pressure differential across the main valve. An electrostatically controlled valve may then be provided for controlling the pressure differential across the main valve. In some embodiments, the electrostatically controlled valve may be adapted to "modulate" the pressure differential across the main valve. For example, the term "modulate" may include controlling the pressure differential across the main valve along a range of pressure differential values.

In another illustrative embodiment, a gas valve includes a valve body having a gas inlet, a gas outlet, and a conduit connecting the gas inlet and the gas outlet. In some embodiments, the conduit includes a first flow chamber, a second flow chamber and a third flow chamber, with a first main gas valve between the first and second flow chambers, and a second main gas valve between the second and third flow chambers. The use of two main gas valves may, in some cases, increase the reliability of the gas valve by providing a certain level of redundancy.

The first main gas valve and the second main gas valve may include a first electrostatic diaphragm valve and a second electrostatic diaphragm valve. A valve may also include one or more electrostatic valve and one or more traditional electromagnetic or like valve. In one illustrative embodiment, a first electrostatic diaphragm valve may be disposed between the first flow chamber and the second flow chamber, and when activated, may be used to create a pressure differential that tends to open the first main gas valve. Likewise, a second electrostatic diaphragm valve may be disposed between the second flow chamber and the third flow chamber, and when activated, may be used to create a pressure differential that tends to open the second main gas valve. In some embodiments, a pressure sensor is provided in fluid communication with the gas outlet to help control the flow of gas through the gas valve.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which:

FIG. 8 is a schematic cross-sectional view of an illustrative embodiment of a pressure sensor;

FIG. 9 is a schematic cross-sectional view of another illustrative embodiment of a pressure sensor;

Figure 1:
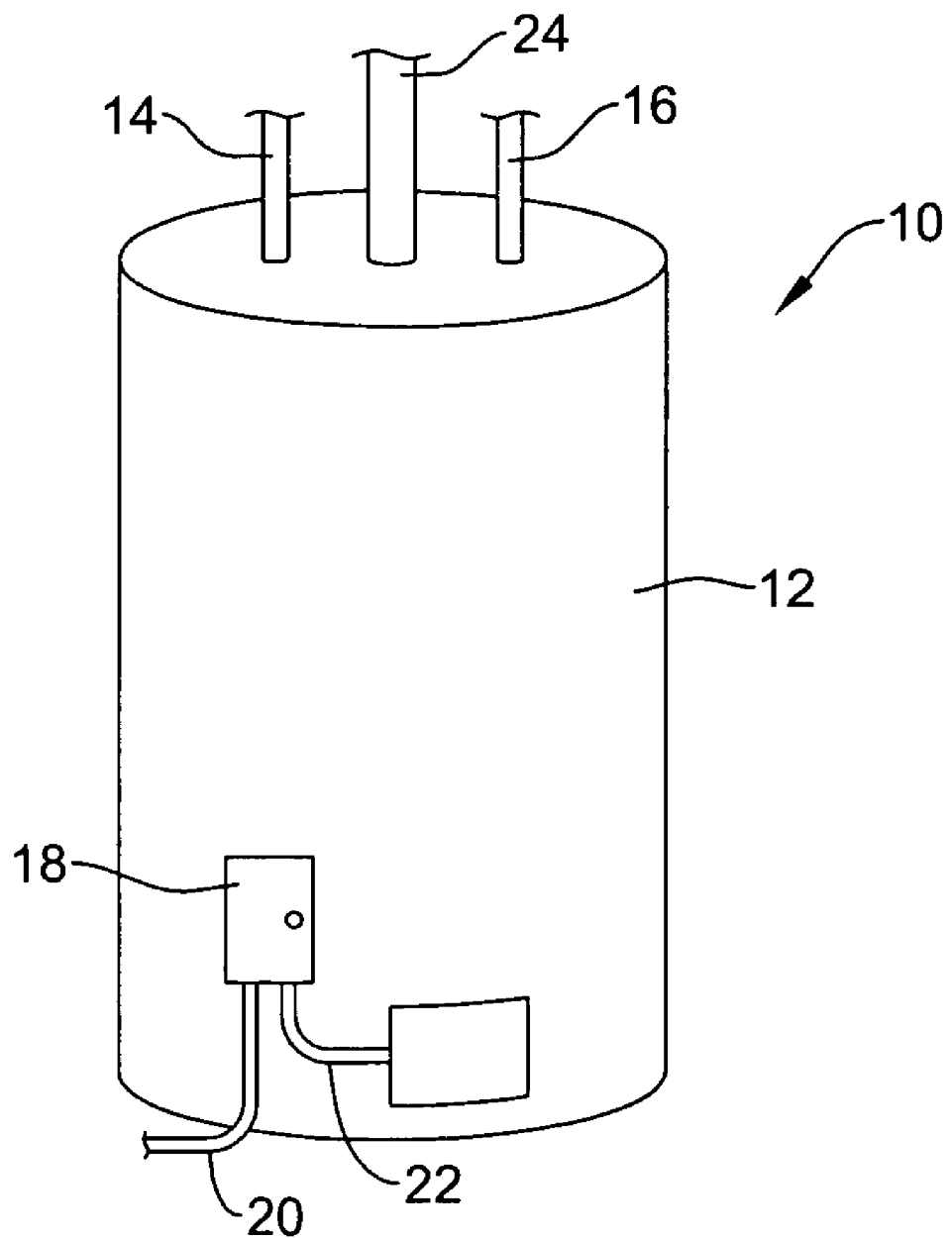
FIG. 1 is a schematic diagram of an illustrative water heater system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

The present invention generally pertains to fuel-fired appliance gas valves that operate on fuels such as natural gas, propane, fuel oil, hydrogen, and/or other combustible fuels. Exemplary fuel-fired appliances include appliances such as gas furnaces, gas water heaters, gas stoves, gas clothes dryers, gas fireplaces and the like. Merely for illustrative purposes, the present invention will be discussed with reference to a gasous fuel-fired water heater, although it is to be understood that the invention is applicable to any fuel-fired appliance.

FIG. 1 illustrates a gas water heater 10. Water heater 10 includes a housing 12 that includes a water tank (not seen). Cold water enters the water tank through cold water line 14 and is heated by a gas burner. The resulting heated water exits through hot water line 16. A gas control unit 18 regulates gas flow from a gas source 20 through combustion gas line 22 and into the gas burner. The gas control unit 18 can include a gas valve for regulating gas flow from the gas source 20 through the combustion gas line 22 and into the gas burner. A flue 24 permits combustion byproducts to safely exit.

Figure 2A:
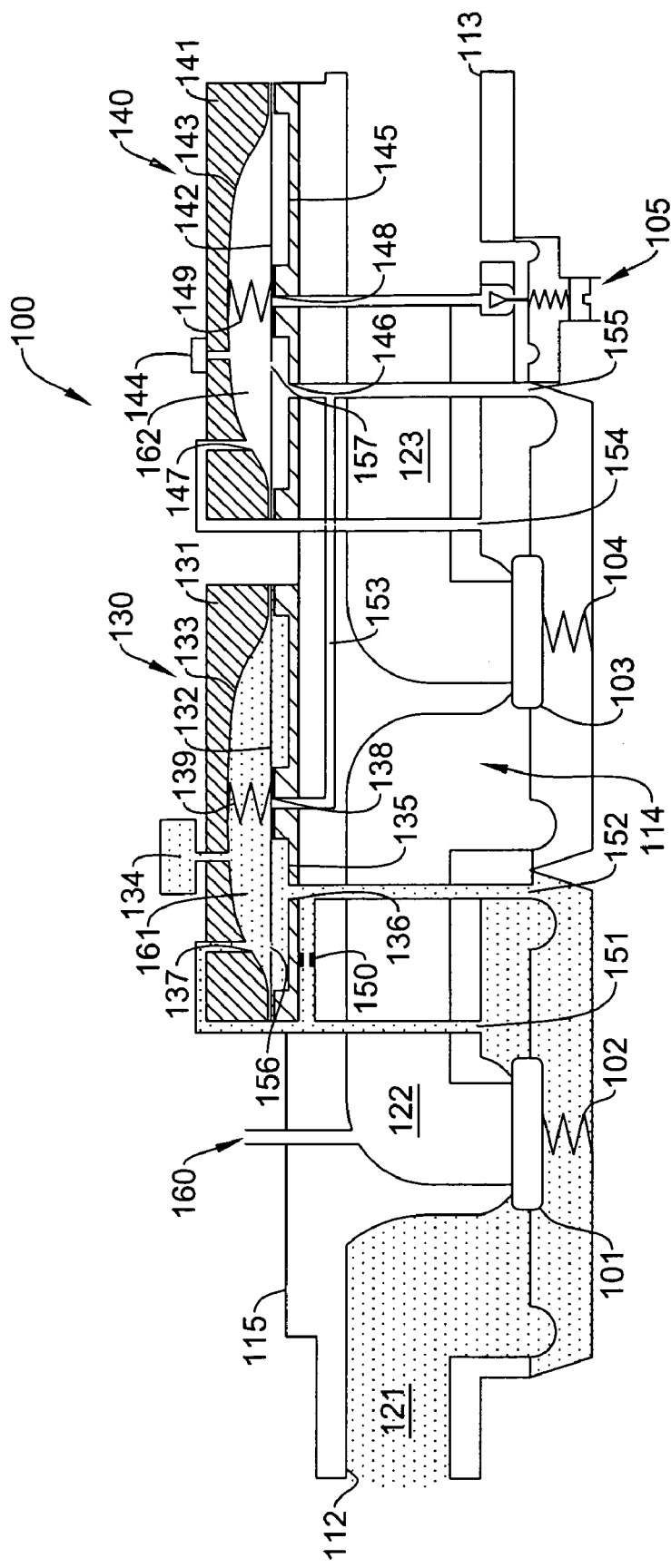
FIG. 2A is a schematic cross-sectional view of an illustrative embodiment of a gas valve with both electrostatic pilot gas valves closed.

FIG. 2A is a schematic cross-sectional view of an illustrative embodiment of a gas valve 100 that may be included in the gas control unit 18 of FIG. 1. The illustrative gas valve 100 includes a valve body 115 that has a gas inlet 112, a gas outlet 113, and a conduit 114 connecting the gas inlet 112 and gas outlet 113. The conduit 114 can include any number of flow chambers. However, in the illustrative embodiment shown, the conduit 114 includes a first flow chamber 121, a second flow chamber 122, and a third flow chamber 123. The first flow chamber 121 is in fluid connection with the gas inlet 112. The third flow chamber 123 is in fluid connection with the gas outlet 113. The second flow chamber 122 can be in selective fluid connection with both the first flow chamber 121 and the third flow chamber 123 via main valves 101 and 103, as further described below.

The first main valve 101 is disposed between the first flow chamber 121 and the second flow chamber 122. In the illustrative embodiment, the first main valve 101 is a diaphragm valve with a resilient spring 102 causing the first main valve 101 to be a normally closed valve. The second main valve 103 is disposed between the second flow chamber 122 and the third flow chamber 123. In the illustrative embodiment, the second main valve 103 is a diaphragm valve with a resilient spring 104 causing the second main valve 103 to also be a normally closed valve. In some embodiments, the first and second main valves 101 and 103 can be controlled by a first electrostatic diaphragm valve 130 and/or a second electrostatic diaphragm valve 140.

In the illustrative embodiment, the first electrostatic diaphragm valve 130 is disposed between the first flow chamber 121 and the second flow chamber 122. In some embodiments, the first electrostatic diaphragm valve 130 is a diaphragm valve with a resilient bias member or spring 139 that causes the first electrostatic diaphragm valve 130 to be a normally closed valve. However, it should be recognized that a separate resilient bias member or spring 139 is not required in all embodiments. For example, in some embodiments, the diaphragm itself may provide a sufficient closing force to the first electrostatic diaphragm valve 130 via, for example, elastic restoring forces within the diaphragm.

Likewise, and in the illustrative embodiment, a second electrostatic diaphragm valve 140 is disposed between the second flow chamber 122 and the third flow chamber 123. In the illustrative embodiment shown, the second electrostatic diaphragm valve 140 is also a diaphragm valve with a resilient bias member or spring 149 causing the second electrostatic diaphragm valve 140 to be a normally closed valve. Again, a separate resilient bias member or spring 149 is not required in all embodiments.

The illustrative first electrostatic diaphragm valve 130 includes a body 131 with a first opposing wall 135 and a second opposing wall 133 that define a valve chamber 161. A first inlet port 136 and a second inlet port 137 extend into the valve chamber 161, as shown. The first inlet port 136 extends through the first opposing wall 135 and the second inlet port 137 extends through the second opposing wall 133. The first and second inlet ports 136 and 137 are in fluid communication with the first flow chamber 121 at a first flow opening 151. An outlet port 138 extends from the valve chamber 161, in some embodiments, through the first opposing wall 135. The inlet ports 136 and 137 and the outlet port 138 can have any useful dimension. In one embodiment, for example, the inlet ports 136 and 137 and the outlet port 138 have a diameter of about 0.5 to 2 mm.

In some embodiments, an air spring 134 may extend from the valve chamber 161 through the second opposing wall 133, but this is not required in all embodiments. The air spring 134 can assist in modulation of the electrostatic valve 130 and can be any useful volume. In one embodiment, the air spring 134 can have a volume of about 3 $cm^3$. In some illustrative embodiments, the electrostatic diaphragm valve 130 can be modulated by adjusting the voltage applied to the electrostatic diaphragm valve 130 (e.g., voltage applied across the electrodes described below.) In the illustrative embodiment shown, as the valve 130 begins to open, both the orifice 156 and the inlet port 137 begin to be closed by movement of the diaphragm 132. The air spring 134 can assist in modulation of the diaphragm by allowing the volume of gas trapped on the upper side of the diaphragm 132 to be compressed into the air spring 134.

The diaphragm 132 is positioned within the valve chamber 161. In the illustrative embodiment, the diaphragm 132 extends generally along the first opposing wall 135 in an un-activated state, as shown. Diaphragm 132 can include one or more electrodes. The electrode(s) may extend to near the edges of the valve chamber 161, and in some embodiments, can extend outside of the chamber 161.

The second opposing wall 133 can include one or more stationary electrodes. The second opposing wall 133 and the diaphragm 132 can thus be configured so that, in the un-activated state, the separation distance between the stationary electrode(s) and the electrode(s) on the diaphragm 132 is smaller near the edges of the valve chamber 161. This may help draw the diaphragm 132 toward the second opposing wall 133 in a rolling action when a voltage is applied between the stationary electrode(s) on the opposing wall 133 and the electrode(s) on the diaphragm 132. Such a rolling action may help improve the efficiency and reduce the voltage requirements of the electrostatic valve 130.

It is contemplated that the diaphragm 132 can have any useful dimensions. In one embodiment, the diaphragm 132 has a diameter in the chamber 161 from 15 to 30 mm. The diaphragm 132 can also have any useful displacement (greatest linear distance between the first opposing wall 135 and the second opposing wall 133). In one embodiment, the diaphragm has a displacement of from about 100 to 200 micrometers, or from 125 to 175 micrometers.

In some embodiments, the diaphragm 132 can include an orifice or aperture 156 that extends or is disposed through the diaphragm 132. This orifice or aperture 156 can allow pressure equalization and flow across the diaphragm 132 when the diaphragm is in the un-activated state. The orifice 156 can be disposed at any useful position on the diaphragm 132, and can have any useful dimension. In one illustrative embodiment, the orifice 156 has a diameter of about 0.5 to 2 mm.

For purposes of illustration, the first opposing wall 135 is shown to be generally flat and with a raised portion adjacent to the outlet 138. However, the first opposing wall 135 may assume other shapes, depending upon the application. For example, the first opposing wall 135 may have different regions that are recessed or protrude against the diaphragm 132 in order to, for example, prevent the diaphragm 132 from achieving a suction lock or stiction against the first opposing wall 135, or to improve the capabilities of the electrostatic valve 130. Other shapes may also be used, including curved shapes. Although the second opposing wall 133 is shown to be generally curved, other shapes may be used, depending on the application.

The body 131 may be made from any suitable semi-rigid or rigid material, such as plastic, ceramic, silicon, etc. In some embodiments, the body 131 is constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable material.

The diaphragm 132 may also be made from any suitable material. In some embodiments, the diaphragm 132 has elastic, resilient, flexible and/or other elastomeric property. In one illustrative embodiment, the diaphragm 132 is made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.). Other suitable materials may also be used, as desired.

The electrode secured to the diaphragm 132 can be provided by, for example, providing, and in some cases patterning, a conductive coating on the diaphragm 132. For example, the diaphragm 132 electrode may be formed by printing, plating or deposition of metal or other conductive material. In some cases, the electrode layer may be patterned using a dry film resist, as is known in the art. The same or similar technique may be used to provide the stationary electrode on the second opposing wall 133 of the body 131. Rather than providing a separate electrode layer, it is contemplated that the diaphragm 132 and/or second opposing wall 133 may be made conductive so as to function as an electrode, if desired.

A dielectric, such as a low temperature organic and inorganic dielectric, may be used as an insulator between the diaphragm 132 electrode and the stationary electrode on the opposing wall 133. The dielectric may be coated over the diaphragm 132 electrode, the stationary electrode on the opposing wall 133, or both. An advantage of using a polymer based substrate and/or diaphragm is that the resulting electrostatic valve may be made cheaper and lighter, and/or suitable for small handheld, or even suitable for disposable or reusable applications. A suitable electrostatically actuated diaphragm valve is described in U.S. Patent Publication No., 2003/0234376, which is incorporated by reference herein.

The illustrative second electrostatic diaphragm valve 140 includes a body 141 with a first opposing wall 145 and a second opposing wall 143 that define a valve chamber 162. A first inlet port 146 and a second inlet port 147 extend into the valve chamber 162, as shown. The first inlet port 146 extends through the first opposing wall 145 and the second inlet port 147 extends through the second opposing wall 143. The first inlet port 146 is in selective fluid connection with the first electrostatic valve 130 via the first electrostatic valve 130 outlet port 138. The second inlet 147 is in fluid communication with the second flow chamber 122 at a second flow opening 154. An outlet port 148 extends from the valve chamber 162, in some embodiments, through the first opposing wall 145. The inlet ports 146 and 147 and the outlet port 148 can have any useful dimension. In one illustrative embodiment, the inlet ports 146 and 147 and the outlet port 148 have a diameter of about 0.5 to 2 mm.

In some embodiments, an air spring (not shown) may extend from the valve chamber 162 through the second opposing wall 143 as described above. In the illustrative embodiment of FIG. 2A, an air spring is not provided, and a seal member 144 is disposed where an optional air spring can be placed.

Like above, a diaphragm 142 is positioned within the valve chamber 162. In the illustrative embodiment, the diaphragm 142 extends generally along the first opposing wall 145 when in an un-activated state, as shown. Diaphragm 142 can include one or more electrodes. The electrode(s) can extend to near the edges of the valve chamber 162, and in some embodiments, extends outside of the chamber 162. The second opposing wall 143 can include one or more stationary electrodes. The second opposing wall 143 and the diaphragm 142 can be configured so that, in the un-activated state, the separation distance between the stationary electrode(s) on the second opposing wall 143 and the electrode(s) on the diaphragm 142 is smaller near the edges of the valve chamber 162. This may help draw the diaphragm 142 toward the second opposing wall 143 in a rolling action when a voltage is applied between the stationary electrode on the opposing wall 143 and the electrode on the diaphragm 142. Such a rolling action may help improve the efficiency and reduce the voltage requirements of the electrostatic valve. The diaphragm 142 can have any useful dimensions. In one embodiment, the diaphragm 142 has a diameter from 15 to 30 mm within the chamber 162. The diaphragm 142 can also have any useful displacement (greatest linear distance between the first opposing wall 145 and the second opposing wall 143). In one embodiment, the diaphragm 142 has a displacement of from about 100 to 200 micrometers.

In some embodiments, the diaphragm 142 can include an orifice 157 or aperture 157 that extends or is disposed through the diaphragm 142. This orifice 157 or aperture 157 can allow pressure equalization across the diaphragm 142. The orifice 157 can have any useful dimension. In one embodiment, the orifice 157 has a diameter of about 0.5 to 2 mm.

For purposes of illustration, the first opposing wall 145 is shown to be generally flat and with a raised portion adjacent the outlet 148. However, the first opposing wall 145 may assume other shapes, depending upon the application. For example, the first opposing wall 145 may have different regions that are recessed or protrude against the diaphragm 142 in order to, for example, prevent the diaphragm 142 from achieving a suction lock and/or stiction against the first opposing wall 145, or to improve the capabilities of the electrostatic valve 140. Other shapes may also be used, including curved shapes, planar shapes or a combination thereof. Although the second opposing wall 143 is shown to be generally curved, other shapes may also be used, depending on the application.

The body 141, diaphragm 142, and electrodes for the second electrostatic valve 140 can be similar to the body 131, diaphragm 132 and electrodes for the first electrostatic valve 130 described above.

An optional pilot outlet 160 can extend from the gas valve 100. In one illustrative embodiment, the pilot outlet 160 can extend from the second flow chamber 122. Also, an optional regulator 105 can be disposed between the gas outlet 113 and the second electrostatic valve 140 outlet port 148.

FIG. 2A shows gas intrusion into the gas valve 100 when both electrostatic valves 130 and 140 are in a closed position. As shown, gas flows into the gas inlet 112, into the first flow opening 151. In the illustrative embodiment, the first flow opening 151 is in fluid connection with the second inlet port 137 and the first inlet port 136. Gas can flow through the first and second inlet ports 136 and 137 onto the valve chamber 161 and air spring 134 (if present.)

A restrictor 150 is shown disposed between the first flow opening 151 and the first inlet port 136. The restrictor 150 can have any useful dimension such as, for example, a diameter of 0.1 to 0.5 mm. Gas can also flow through the restrictor 150 to a backside of the first main valve 101 through a first backside flow opening 152. The restrictor 150 can limit the flow of gas to the backside of the first main valve 101 through a first backside flow opening 152, and create a pressure drop there across. By limiting the flow of gas through the first backside flow opening 152, the restrictor 150 can limit the gas pressure on the backside of the first main valve 101 to less than the gas pressure in the first flow chamber 121 when gas is flowing through the restrictor 150. However, in steady state, the gas pressure on the backside of the first main valve 101 is substantially the same as the gas pressure in the first flow chamber 121, and the spring 102 keeps the first main valve 101 closed.

Figure 2B:
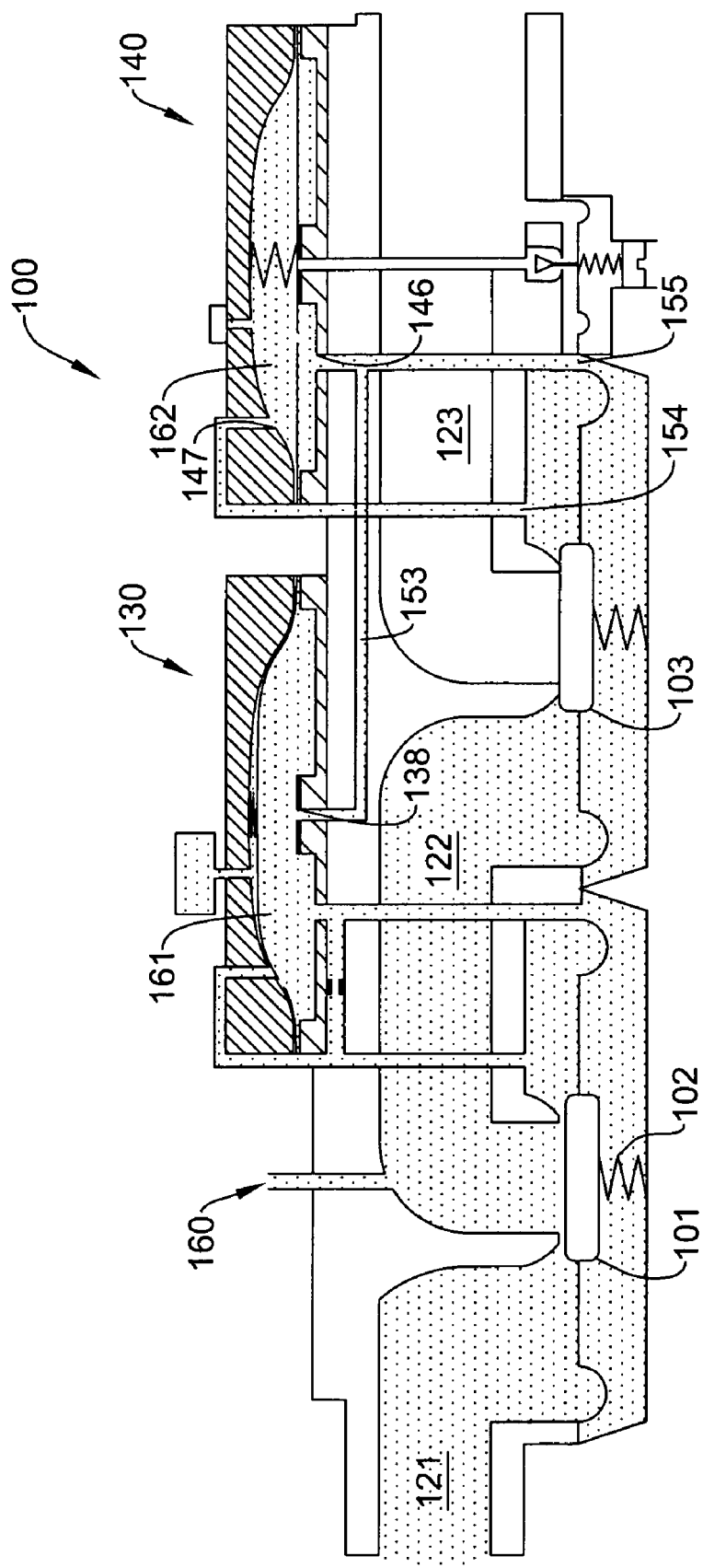
FIG. 2B is a schematic cross-sectional view of the illustrative gas valve shown in FIG. 2A with one electrostatic pilot gas valve closed.

FIG. 2B is a schematic cross-sectional view of the illustrative gas valve shown in FIG. 2A with the first electrostatic valve 130 open and the second electrostatic gas valve 140 closed. As shown, gas flows from the first electrostatic valve 130 chamber 161 into the first electrostatic valve 130 gas outlet port 138, through a connecting conduit 153 into the second electrostatic valve 140 inlet port 146 and into the second electrostatic valve 140 chamber 162. Gas can then flow through the gas inlet port 147 and into the second flow chamber 122 via the second flow opening 154. Gas can also flow from the connecting conduit 153 to the backside of the second main valve 103 via a second backside flow opening 155. In some embodiments, gas flow past the restrictor 150 can cause at least a momentary pressure differential across the first flow chamber 121 and the backside of the first main valve 101, thus causing the first main valve 101 to open, at least momentarily.

Figure 2C:
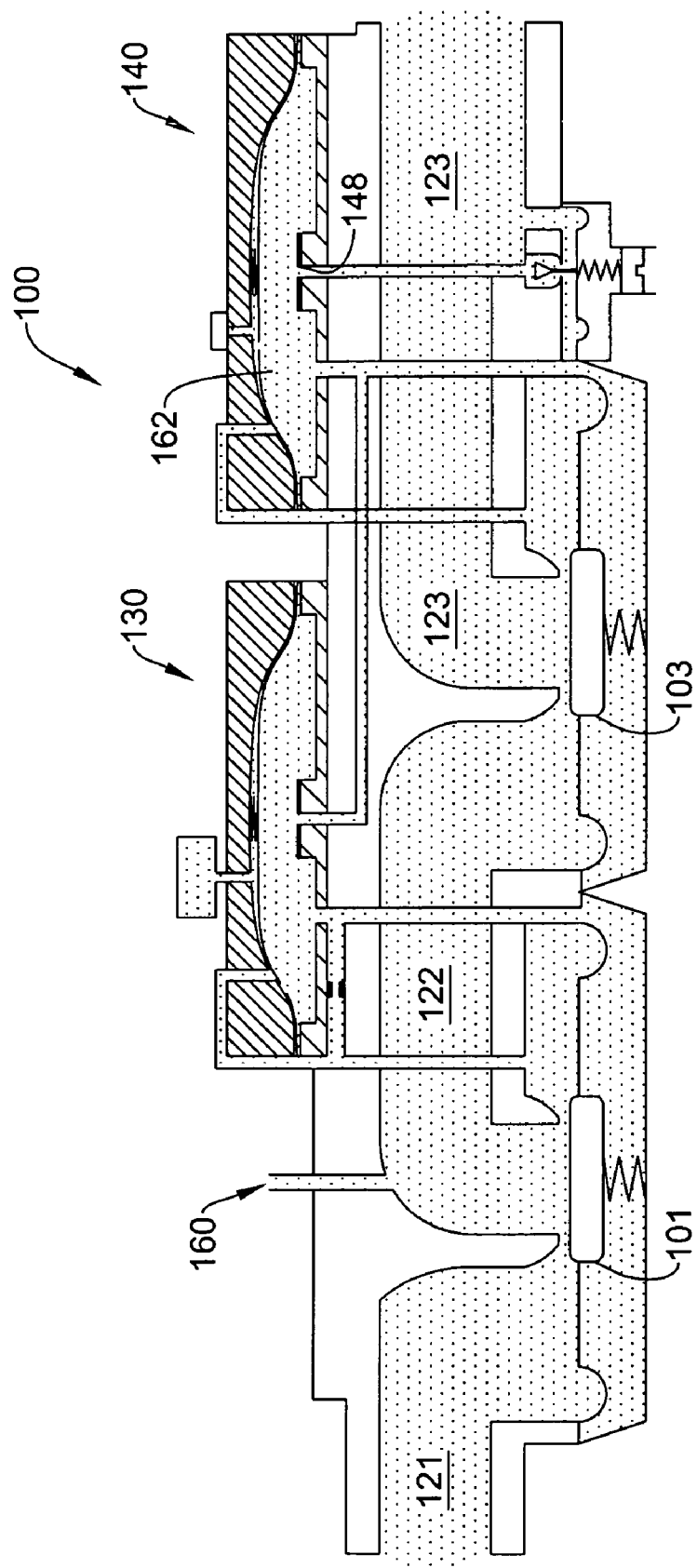
FIG. 2C is a schematic cross-sectional view of the illustrative gas valve shown in FIG. 2B with both electrostatic pilot gas valves open.

FIG. 2C is a schematic cross-sectional view of the illustrative gas valve shown in FIG. 2B with both electrostatic gas valves 130 and 140 in an open position. As shown, gas flows from chamber 162 of the second electrostatic valve 140 into the third flow chamber 123 via the outlet port 148. As gas flow increases though the gas valve 100, the first and second main valves 101 and 103 respond by opening accordingly.

Figure 3:
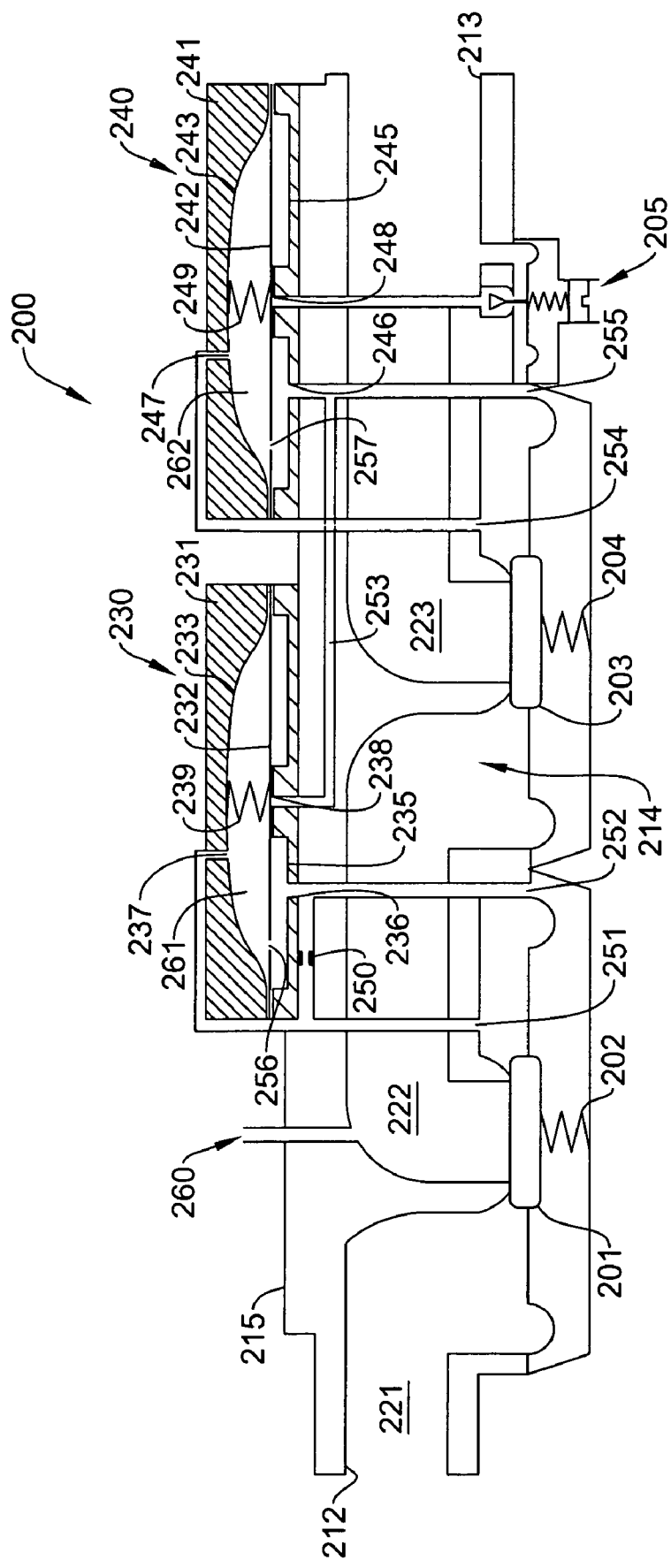
FIG. 3 is a schematic cross-sectional view of another illustrative embodiment of a gas valve.

FIG. 3 is a schematic cross-sectional view of another illustrative embodiment of a gas valve 200 with both electrostatic gas valves closed. The gas valve 200 includes a valve body 215 that has a gas inlet 212, a gas outlet 213, and a conduit 214 connecting the gas inlet 212 and gas outlet 213. The conduit 214 can include any number of flow chambers. In the illustrative embodiment shown, the conduit 214 includes a first flow chamber 221, a second flow chamber 222, and a third flow chamber 223. The first flow chamber 221 can be in fluid connection with the gas inlet 212. The third flow chamber 223 can be in fluid connection with the gas outlet 213. The second flow chamber 222 can be in selective fluid connection with both the first flow chamber 221 and the third flow chamber 223.

A first main valve 201 can be disposed between the first flow chamber 221 and the second flow chamber 222. In the illustrative embodiment, the first main valve 201 is a diaphragm valve with a resilient spring 202 causing the first main valve 201 to be a normally closed valve. A second main valve 203 can be disposed between the second flow chamber 222 and the third flow chamber 223. In the illustrative embodiment shown, the second main valve 203 is a diaphragm valve with a resilient spring 204 causing the second main valve 203 to be a normally closed valve.

In some embodiments, the first and second main valves 201 and 203 can be controlled by a first electrostatic diaphragm valve 230 and/or a second electrostatic diaphragm valve 240, For example, the first electrostatic diaphragm valve 230 can be disposed between the first flow chamber 221 and the second flow chamber 222. In the illustrative embodiment, the first electrostatic diaphragm valve 230 is a diaphragm valve with a resilient bias member or spring 239 causing the first electrostatic diaphragm valve 230 to be a normally closed valve. However, it is contemplated that a separate resilient bias member or spring 239 is not required in all embodiments. For example, in some embodiments, the diaphragm itself may provide elastic restoring forces sufficient to close the valve.

The second electrostatic diaphragm valve 240 can be disposed between the second flow chamber 222 and the third flow chamber 223. In the illustrative embodiment, the second electrostatic diaphragm valve 240 is a diaphragm valve with a resilient bias member or spring 249 causing the second electrostatic diaphragm valve 240 to be a normally closed valve. Again, a separate resilient bias member or spring 149 is not required in all embodiments.

The illustrative first electrostatic diaphragm valve 230 includes a body 231 with a first opposing wall 235 and a second opposing wall 233 that define a valve chamber 261. A first inlet port 236 and a second inlet port 237 extend into the valve chamber 261, as shown. The first inlet port 236 extends through the first opposing wall 235 and the second inlet port 237 extends through the second opposing wall 233.

The first and second inlet ports 236 and 237 are in fluid communication with the first flow chamber 221 at a first flow opening 251. An outlet port 238 extends from the valve chamber 261, in some embodiments, through the first opposing wall 235. The inlet ports 236 and 237 and the outlet port 238 can have any useful dimension. In one embodiment, the inlet ports 236 and 237 and the outlet port 238 have a diameter of about 0.5 to 2 mm.

In some embodiments, the inlet port 237 is disposed near a center of the second opposing wall 233. As voltage is applied to the electrostatic valve 230, the diaphragm 232 moves toward the second opposing wall 233 and can eventually seal the inlet port 237 disposed on the second opposing wall 233. The inlet port 237 can assist in modulation of the electrostatic valve 230. In some illustrative embodiments, the electrostatic diaphragm valve 230 can be modulated by adjusting the voltage applied to the electrostatic diaphragm valve 230 (e.g., voltage applied across the electrodes described below.)

A diaphragm 232 is positioned within the valve chamber 261. In the illustrative embodiment, the diaphragm 232 extends generally along the first opposing wall 235 in an un-activated state, as shown. Diaphragm 232 can include one or more electrodes. For example, an electrode can extend near the edges of the valve chamber 261, and in some embodiments, can extend outside of the chamber 261.

The second opposing wall 233 can include one or more stationary electrodes. The second opposing wall 233 and the diaphragm 232 can be configured so that, in the un-activated state, the separation distance between the stationary electrode and the electrode on the diaphragm 232 is smaller near the edges of the valve chamber 261. This may help draw the diaphragm 232 toward the second opposing wall 233 in a rolling action when a voltage is applied between the stationary electrode on the opposing wall 233 and the electrode on the diaphragm 232. Such a rolling action may help improve the efficiency and reduce the voltage requirements of the electrostatic valve.

The diaphragm 232 can have any useful dimensions. In one embodiment, the diaphragm 232 has a diameter from 15 to 30 mm inside of the chamber 261. The diaphragm 232 can have any useful displacement (greatest linear distance between the first opposing wall 235 and the second opposing wall 233). In one embodiment, the diaphragm has a displacement of from about 100 to 200 micrometers.

The diaphragm 232 can include an orifice or aperture 256 that extends or is disposed through the diaphragm 232. This orifice or aperture 256 can allow pressure equalization across the diaphragm 232. The orifice 256 can be placed at any useful position on the diaphragm 232, and can have any useful dimension. In one embodiment, the orifice 256 has a diameter of about 0.5 to 2 mm.

For purposes of illustration, the first opposing wall 235 is shown to be generally flat and with a raised portion adjacent the outlet 238. However, the first opposing wall 235 may assume other shapes, depending upon the application. For example, the first opposing wall 235 may have different regions that are recessed or protrude against the diaphragm 232 in order to, for example, prevent the diaphragm 232 from achieving a suction lock and/or stiction against the first opposing wall 235, or to improve the capabilities of the electrostatic valve 230. Other shapes may also be used, including curved shapes, planar shapes, or a combination of curved and planar shapes, as desired. Although the second opposing wall 233 is shown to be generally curved, other shapes may be used, depending on the application.

The body 231 may be made from any suitable semi-rigid or rigid material, such as plastic, ceramic, silicon, etc. In some embodiments, the body 231 is constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable material.

The diaphragm 232 may be made from any suitable material. In some embodiments, the diaphragm 232 has elastic, resilient, flexible and/or other elastomeric property. In one illustrative embodiment, the diaphragm 232 is made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material.

The electrode secured to the diaphragm 232 can be provided, for example, by patterning a conductive coating on the diaphragm 232. For example, the diaphragm 232 electrode(s) may be formed by printing, plating or deposition of metal or other conductive material. In some cases, the electrode layer may be patterned using a dry film resist, as is known in the art. The same or similar techniques may be used to provide the stationary electrode on the second opposing wall 233 of the body 231. Rather than providing a separate electrode layer, it is contemplated that the diaphragm 232 and/or second opposing wall 233 may be made conductive so as to function as an electrode.

A dielectric, such as a low temperature organic and inorganic dielectric, may be used as an insulator between the diaphragm 232 electrode and the stationary electrode on the opposing wall 233. The dielectric may be coated over the diaphragm 232 electrode, the stationary electrode on the opposing wall 233, or both. An advantage of using a polymer based substrate and/or diaphragm is that the resulting electrostatic valve may be made cheaper and lighter, and/or suitable for small handheld, or even suitable for disposable or reusable applications.

The illustrative second electrostatic diaphragm valve 240 includes a body 241 with a first opposing wall 245 and a second opposing wall 243 that define a valve chamber 262. A first inlet port 246 and a second inlet port 247 extend into the valve chamber 262, as shown. The first inlet port 246 extends through the first opposing wall 245 and the second inlet port 247 extends through the second opposing wall 243. The first inlet port 246 is in selective fluid connection with the first electrostatic valve 230 via the first electrostatic valve 230 outlet port 238. The second inlet 247 is in fluid communication with the second flow chamber 222 at a second flow opening 254. An outlet port 248 extends from the valve chamber 262, in some embodiments, through the first opposing wall 245. The inlet ports 246 and 247 and the outlet port 248 can have any useful dimension. In one embodiment, the inlet ports 246 and 247 and the outlet port 248 have a diameter of about 0.5 to 2 mm.

In some embodiments, the inlet port 247 is disposed near a center of the second opposing wall 243. As voltage is applied to the electrostatic valve 240, the diaphragm 242 moves toward the second opposing wall 243. Eventually, the diaphragm 242 seals the inlet port 247. In some illustrative embodiments, the electrostatic diaphragm valve 240 can be modulated by adjusting the voltage applied to the electrostatic diaphragm valve 240 (e.g., voltage applied across the electrodes described below.)

The diaphragm 242 is positioned within the valve chamber 261. In the illustrative embodiment, the diaphragm 242 extends generally along the first opposing wall 245 in an un-activated state, as shown. Diaphragm 242 can include one or more electrodes. The electrode(s) can extend near the edges of the valve chamber 262, and in some embodiments, can extend outside of the chamber 262. The second opposing wall 243 can include one or more stationary electrodes. The second opposing wall 243 and the diaphragm 242 can be configured so that, in the un-activated state, the separation distance between the stationary electrode on the second opposing wall 243 and the electrode on the diaphragm 242 is smaller near the edges of the valve chamber 261. This may help draw the diaphragm 242 toward the second opposing wall 243 in a rolling action when a voltage is applied between the stationary electrode on the opposing wall 243 and the electrode on the diaphragm 242. Such a rolling action may help improve the efficiency and reduce the voltage requirements of the electrostatic valve.

The diaphragm 242 can have any useful dimensions. In one embodiment, the diaphragm 242 has a diameter from 15 to 30 mm. The diaphragm 242 can have any useful displacement (greatest linear distance between the first opposing wall 245 and the second opposing wall 243). In one embodiment, the diaphragm 242 has a displacement of from about 100 to 200 micrometers.

The diaphragm 242 can include an orifice or aperture 257 that extends or is disposed through the diaphragm 242. This orifice or aperture 257 can allow pressure equalization across the diaphragm 242, when the orifice or aperture 257 is not sealed against the second opposing wall 243. The orifice 257 can have any useful dimension. In one embodiment, the orifice 257 has a diameter of about 0.5 to 2 mm.

For purposes of illustration, the first opposing wall 245 is shown to be generally flat and with a raised portion adjacent the outlet 248. However, the first opposing wall 245 may assume other shapes, depending upon the application. For example, the first opposing wall 245 may have different regions that are recessed or protrude against the diaphragm 242 in order to, for example, prevent the diaphragm 242 from achieving a suction lock and/or stiction against the first opposing wall 245, or to improve the capabilities of the electrostatic valve 240. Other shapes may also be used, including curved shapes, planar shapes, or a combination of curved and planar shapes, as desired. Although the second opposing wall 243 is shown to be generally curved, other shapes may be used, depending on the application. The body 241, diaphragm 242, and electrodes for the second electrostatic valve 240 can be similar to the body 231, diaphragm 232 and electrodes for the first electrostatic valve 230 described above.

An optional pilot outlet 260 can extend from the gas valve 200. In one illustrative embodiment, the pilot outlet 260 can extend from the second flow chamber 222. Also, an optional regulator 205 can be disposed between the gas outlet 213 and the second electrostatic valve 240 outlet port 248.

Figure 4:
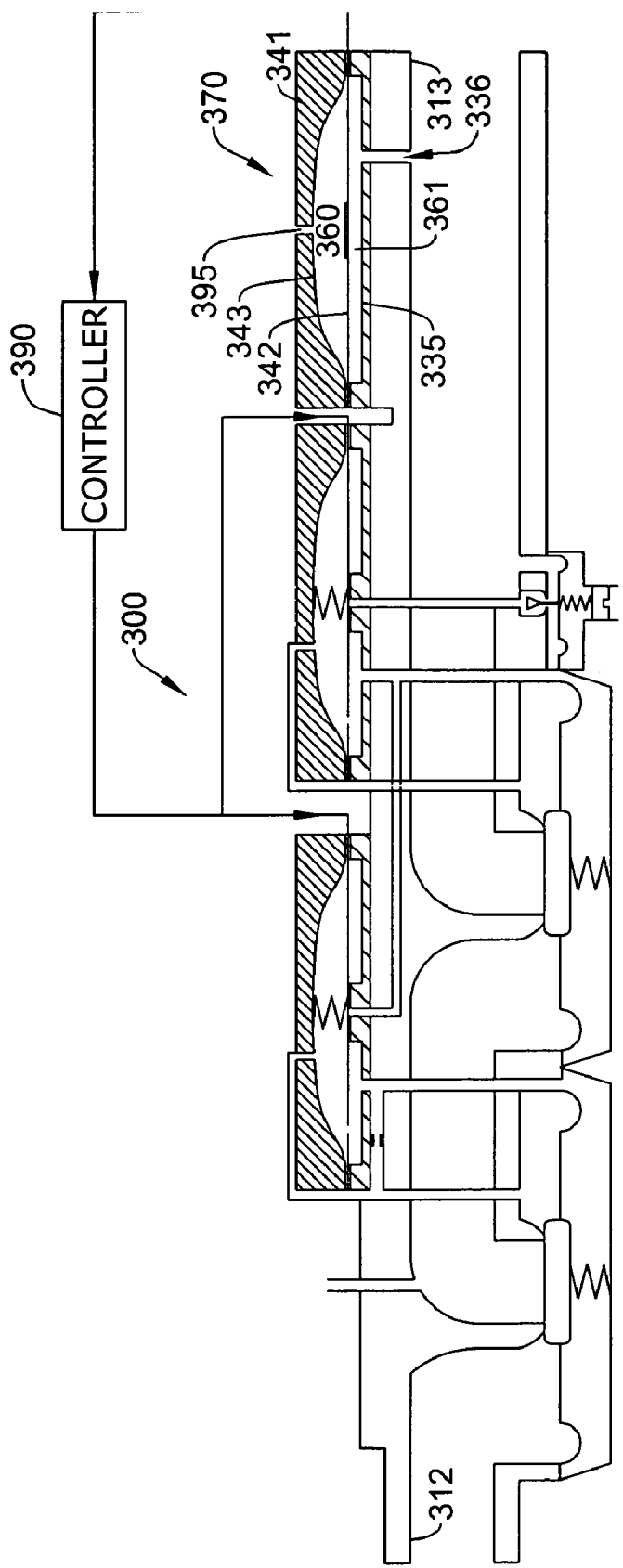
FIG. 4 is a schematic cross-sectional view of another illustrative embodiment of a gas valve.

FIG. 4 is a schematic cross-sectional view of an illustrative embodiment of a gas valve 300 that includes an optional pressure sensor 370. The pressure sensor 370 can be disposed on any of the embodiments of the gas valve, as desired. The pressure sensor 370 can be electrically coupled to a controller 390 to aid in modulating the electrostatic diaphragm valves described herein. The pressure sensor 370, with its associated control electronics, can optionally replace the pressure regulator 105, 205 and 405 described herein.

The pressure sensor 370 can be included on the gas valve 300 as shown. In one illustrative embodiment, the pressure sensor 370 is in fluid communication with the gas outlet 313 via a pressure sensor conduit 336. The pressure sensor conduit 336 can have any useful dimension such as 1 to 2 mm². The pressure sensor 370 shown is an electrostatic diaphragm type pressure sensor, in other embodiments, the pressure sensor and be a traditional pressure sensor.

The illustrative electrostatic diaphragm type pressure sensor 370 includes a body 341 with a first opposing wall 335, a second opposing wall 343, and a diaphragm 342 disposed between the first opposing wall 335 and the second opposing wall 343. The first opposing wall 335 and the diaphragm 342 define a pressure sensing chamber 361. The second opposing wall 343 and the diaphragm 342 define a chamber 360 open to the atmosphere via conduit 395. The pressure sensor conduit 336 allows gas to flow into the pressure sensing chamber 361. The gas flow exerts a force on the diaphragm 342 and can move the diaphragm 342 toward at least a portion of the second opposing wall 343. Pressure can be determined by measuring the capacitance between the diaphragm 342 electrode and the opposing wall 343 electrode.

In the illustrative embodiment, the diaphragm 342 extends generally along the first opposing wall 335 (the first opposing wall preferably including an electrically insulating material) in an un-pressurized state, as shown. Diaphragm 342 can include one or more electrodes on an insulating membrane as described in U.S. Patent Application Publication No., 2003/0234376. Like above, the electrode(s) can extend near the edges of the sealed chamber 360. The second opposing wall 343 can include one or more stationary electrodes. The second opposing wall 343 and the diaphragm 342 can be configured so that, in the un-pressurized state, the separation distance between the stationary electrode and the electrode on the diaphragm 342 is smaller near the edges of the sealed chamber 360. This may help the diaphragm 342 move toward the second opposing wall 343 in a rolling action when gas pressure is applied to the diaphragm 342. Such a rolling action may help increase the precision of the electrostatic pressure sensor 370, particularly at lower input pressures.

The diaphragm 342 can have any useful dimensions. In one embodiment, the diaphragm 342 has a diameter from 15 to 30 mm. The diaphragm 342 can also have any useful displacement (greatest linear distance between the first opposing wall 335 and the second opposing wall 343). In one embodiment, the diaphragm has a displacement of from about 100 to 200 micrometers.

For purposes of illustration, the first opposing wall 335 is shown to be generally planar. However, the first opposing wall 335 may assume other shapes, depending upon the application. For example, the first opposing wall 335 may have different regions that are recessed or protrude against the diaphragm 342 in order to, for example, improve the capabilities of the electrostatic pressure sensor 370. Other shapes may also be used, including planar shapes, curved shapes, or a combination of curved and planar shapes, as desired. Although the second opposing wall 343 is shown to be generally curved, other shapes may be used, depending on the application.

The second opposing wall 343 is shown in FIG. 4 as having a generally curved shape. However, the second opposing wall 343 can have a planar shape or a combination of curved and planar shapes, as desired. The shape of the second opposing wall 343 can be selected to obtain a desired pressure versus capacitance output curve.

Figure 5:
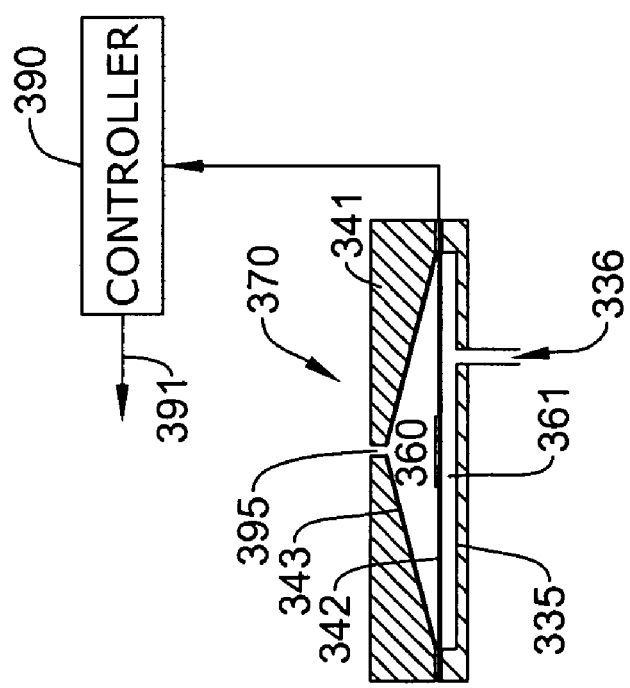
FIG. 5 is a schematic cross-sectional view of an illustrative embodiment of a pressure sensor.
Figure 7:
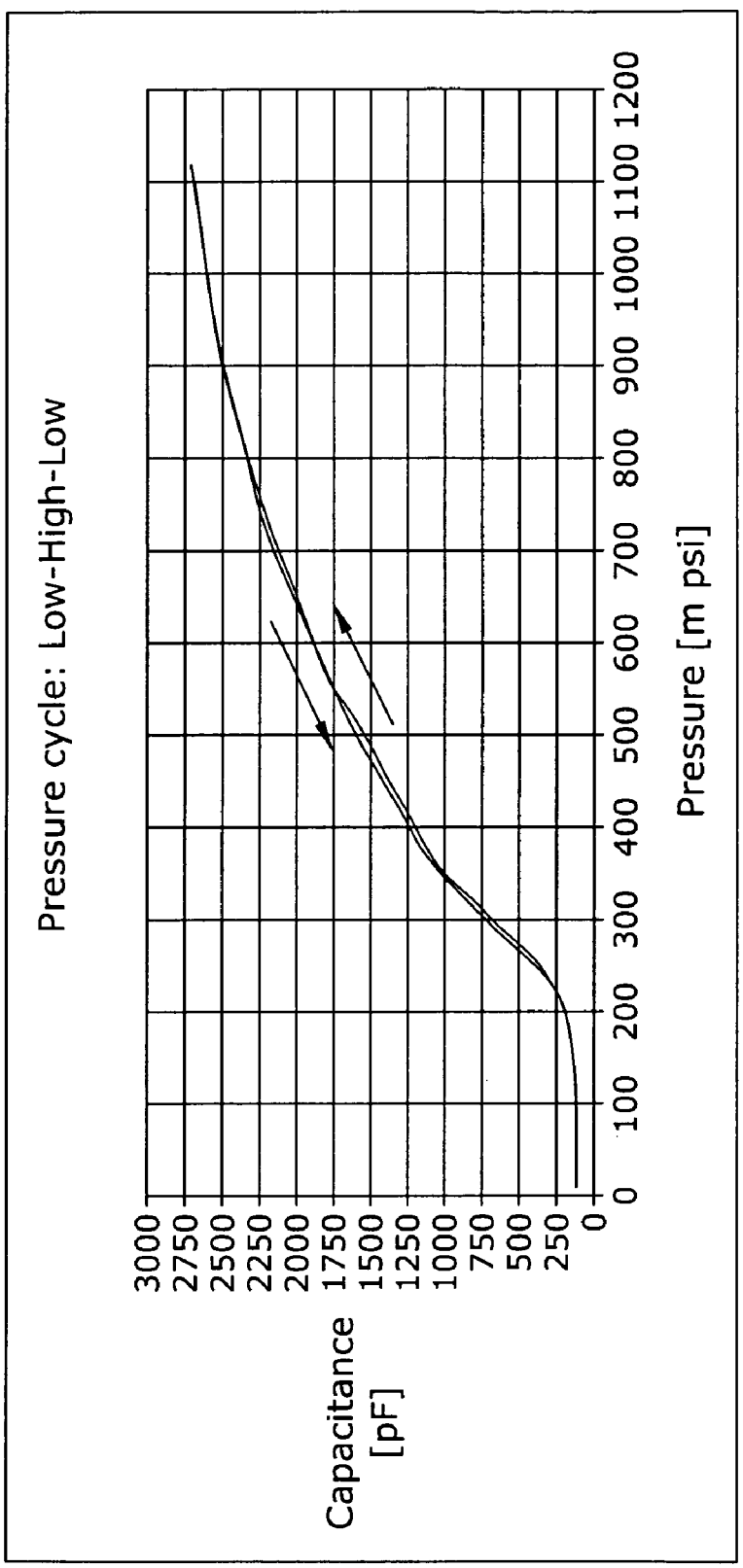
FIG. 7 is a graph of capacitance versus pressure for the pressure sensor shown in FIG. 6.

For example, FIG. 5 shows an illustrative pressure sensor 370 that includes a body 341 with a first opposing wall 335 and a second opposing wall 343 (including a stationary electrode), and a diaphragm 342 (including a movable electrode) disposed between the first opposing wall 335 and the second opposing wall 343. The first opposing wall 335 and the diaphragm 342 define a pressure sensing chamber 361. The second opposing wall 343 and the diaphragm 342 define a chamber 360 open to the atmosphere via conduit 395. The second opposing wall 343 has a planar shape. FIG. 7 illustrates one possible pressure versus capacitance curve for the pressure sensor 370 shown in FIG. 5. Note, in the illustrative embodiment, the pressure versus capacitance curve is fairly linear along a relatively wide range of pressures.

The pressure sensor conduit 336 allows gas to flow into the pressure sensing chamber 361. The gas flow exerts a force on the diaphragm 342 and moves the diaphragm 342 (and movable electrode) toward at least a portion of the second opposing wall 343 (including the stationary electrode). Pressure can be determined by measuring the capacitance between the diaphragm 342 electrode and the opposing wall 343 electrode by the controller 390. The controller 390 can provide an output signal based, at least in part, on the measured capacitance.

Figure 6:
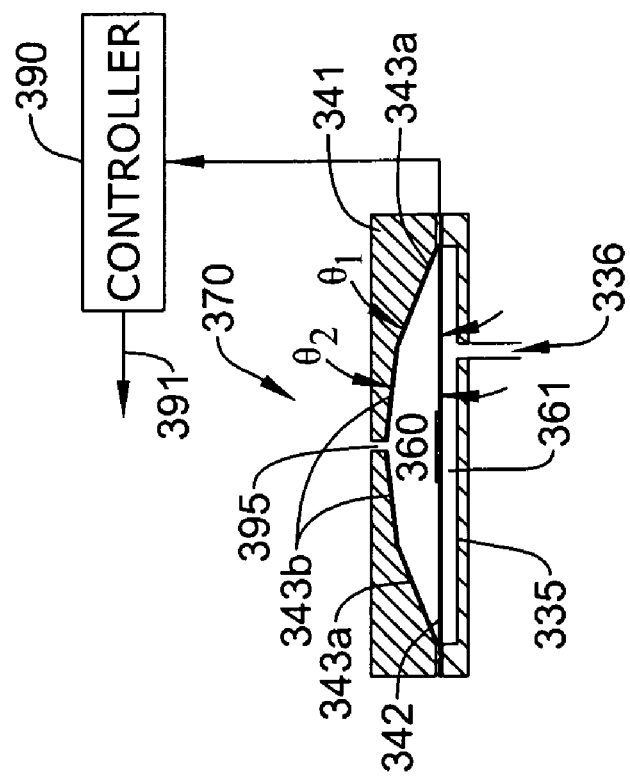
FIG. 6 is a schematic cross-sectional view of another illustrative embodiment of a pressure sensor.

FIG. 6 shows another illustrative embodiment of a pressure sensor 370 that includes a body 341 with a first opposing wall 335 and a second opposing wall 343 (including a fixed electrode), and a diaphragm 342 (including a movable electrode) disposed between the first opposing wall 335 and the second opposing wall 343a and 343b. The first opposing wall 335 and the diaphragm 342 define a pressure sensing chamber 361. The second opposing wall 343a and 343b and the diaphragm 342 define a chamber 360 open to the atmosphere via conduit 395. The second opposing wall 343a and 343b has a compound planar shape. A second opposing wall first portion 343a can form a first angle $\theta_1$ with respect to the diaphragm 342. A second opposing wall second portion 343b can form a second angle $\theta_2$ with respect to the diaphragm 342. The first angle and the second angle can be different. In the embodiment shown, the second angle $\theta_2$ is less or smaller than the first angle $\theta_1$. This may alter the shape of the pressure versus capacitance curve of the pressure sensor, as desired.

FIG. 8 shows another illustrative pressure sensor 370. The pressure sensor 370 includes a first pressure sensor element 370A and a second pressure sensor element 370B in fluid communication with a pressure sensor conduit 336 that allows gas to flow into the pressure sensing chamber 361. The second opposing walls 343a and 343b and the diaphragm 342 define two chambers 360a and 360b open to the atmosphere via conduits 395a and 395b. The gas flow exerts a force on the diaphragm 342 (movable electrode) and can move the diaphragm 342 toward at least a portion of the second opposing wall 343a and 343b (stationary electrode). Pressure can be determined by measuring the capacitance between the diaphragm 342 electrode and the opposing wall 343a and 343b electrode by the controller.

It is understood that the pressure sensor 370 can be formed of 3, 4, 5, 6 or more pressure sensor elements. A second opposing wall first portion 343a can form a first angle $\theta_3$ with respect to the diaphragm 342. A second opposing wall second portion 343b can form a second angle $\theta_4$ with respect to the diaphragm 342. The first angle and the second angle can be different. In the embodiment shown, the first angle $\theta_3$ is less than the second angle $\theta_4$. In some embodiments, the first pressure sensor element 370A may be used to measure lower input pressures, while the second pressure sensor element 370B may be used to measure higher input pressures.

FIG. 9 shows another embodiment of a pressure sensor 370 array including a first pressure sensor element $S_1$, a second pressure sensor element $S_2$, and a third pressure sensor element $S_3$. Each pressure sensor element is shown in fluid communication with a separate pressure sensor conduit 336a, 336b, and 336c, respectively to allow gas to flow into each pressure sensing chamber 361a, 336b, and 336c, respectively. It is understood that the pressure sensor 370 array can be formed of 2, 3, 4, 5, 6 or more pressure sensor elements, as desired. Each pressure sensor includes a chamber 360a, 360b and 360c open to the atmosphere via conduit 395a, 395b, and 395c.

A second opposing wall first portion 343a can form a first angle $\theta_5$ with respect to the diaphragm 342a. A second opposing wall second portion 343b can form a second angle $\theta_6$ with respect to the diaphragm 342b. A second opposing wall second portion 343c can form a third angle $\theta_7$ with respect to the diaphragm 342c. The first angle, second angle, and third angle can be different. In the embodiment shown, the first angle $\theta_5$ is less than the second angle $\theta_6$, and the second angle $\theta_6$ is less than the third angle $\theta_7$.

Figure 10:
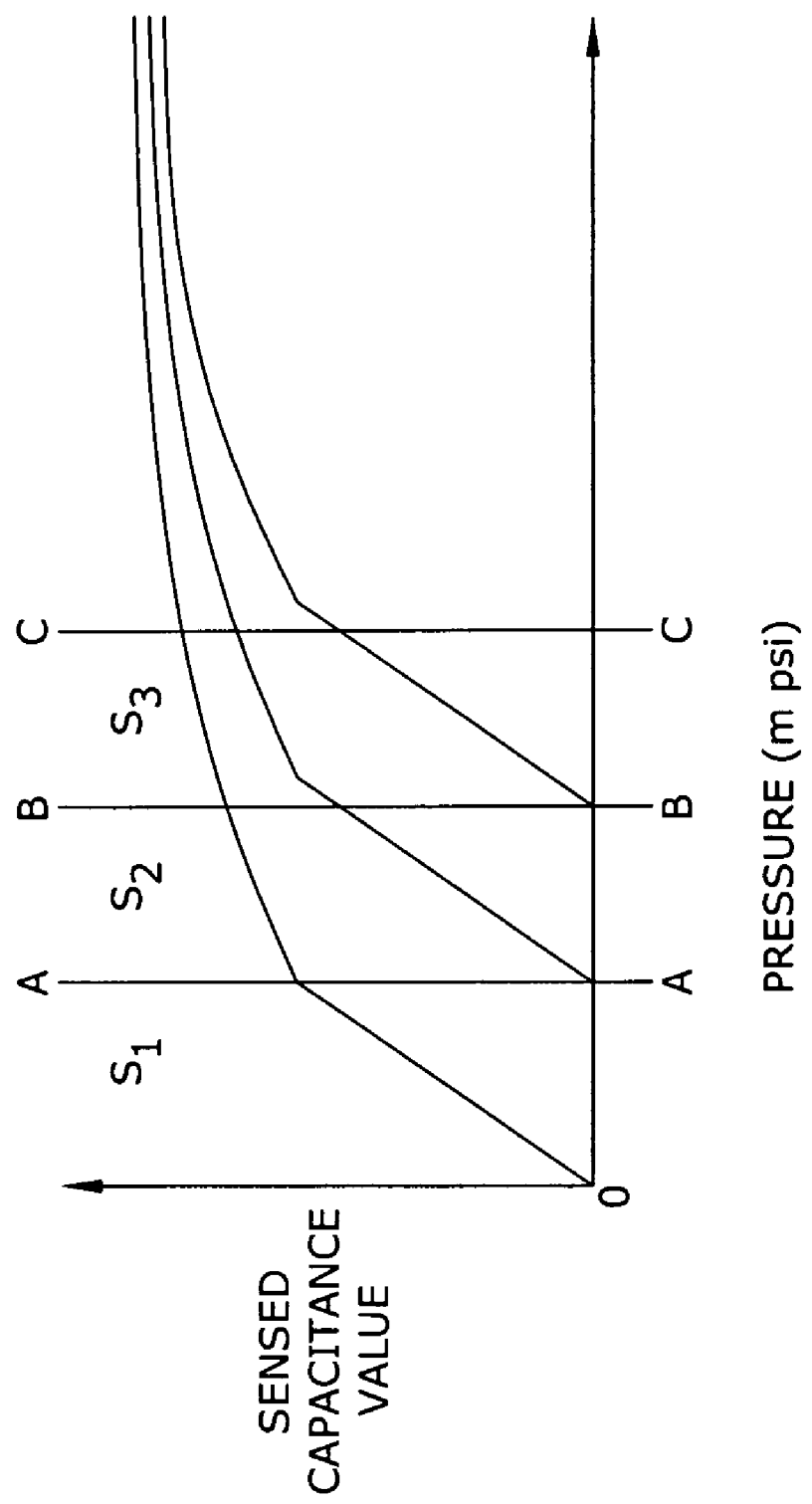
FIG. 10 is a graph of capacitance versus pressure for the pressure sensor shown in FIG. 9.

FIG. 10 illustrates a graph of sensed capacitance value versus pressure for a pressure sensor 370 array shown in FIG. 9, when the same an input pressure is provided to the pressure sensor conduits 336a, 336b and 336c. In this embodiment, the first pressure sensor element $S_1$ can have a linear pressure sensitive region from 0 to A—A, the second pressure sensor element $S_2$ can have a linear pressure sensitive region from A—A to B—B, and a third pressure sensor element $S_3$ can have a linear pressure sensitive region from B—B to C—C. The pressure sensor 370 array can thus provide a more precise pressure sensing value over a wider pressure range.

The body 341 may be made from any suitable semi-rigid or rigid material, such as plastic, ceramic, silicon, etc. In some embodiments, the body 341 is constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable material.

The diaphragm 342 may be made from any suitable material. For example, the diaphragm 342 may be made from a material having an elastic, resilient, flexible and/or other elastomeric property. In one illustrative embodiment, the diaphragm 342 is made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material.

The electrode secured to the diaphragm 342 can be provided, for example, by patterning a conductive coating on the diaphragm 342. For example, the diaphragm 342 electrode may be formed by printing, plating or deposition of metal or conductive material. In some cases, the electrode layer may be patterned using a dry film resist, as is known in the art. The same or similar techniques may be used to provide the stationary electrode on the second opposing wall 343 of the body 341. Rather than providing a separate electrode layer, it is contemplated that the diaphragm 342 and/or second opposing wall 343 may be made conductive so as to function as an electrode.

A dielectric, such as a low temperature organic and inorganic dielectric, may be used as an insulator between the diaphragm 342 electrode and the stationary electrode on the opposing wall 343. The dielectric may be coated over the diaphragm 342 electrode, the stationary electrode on the opposing wall 343, or both. An advantage of using a polymer based substrate and/or diaphragm is that the resulting electrostatic valve may be made cheaper and lighter, and/or suitable for small handheld, or even suitable for disposable or reusable applications.

Figure 11A:
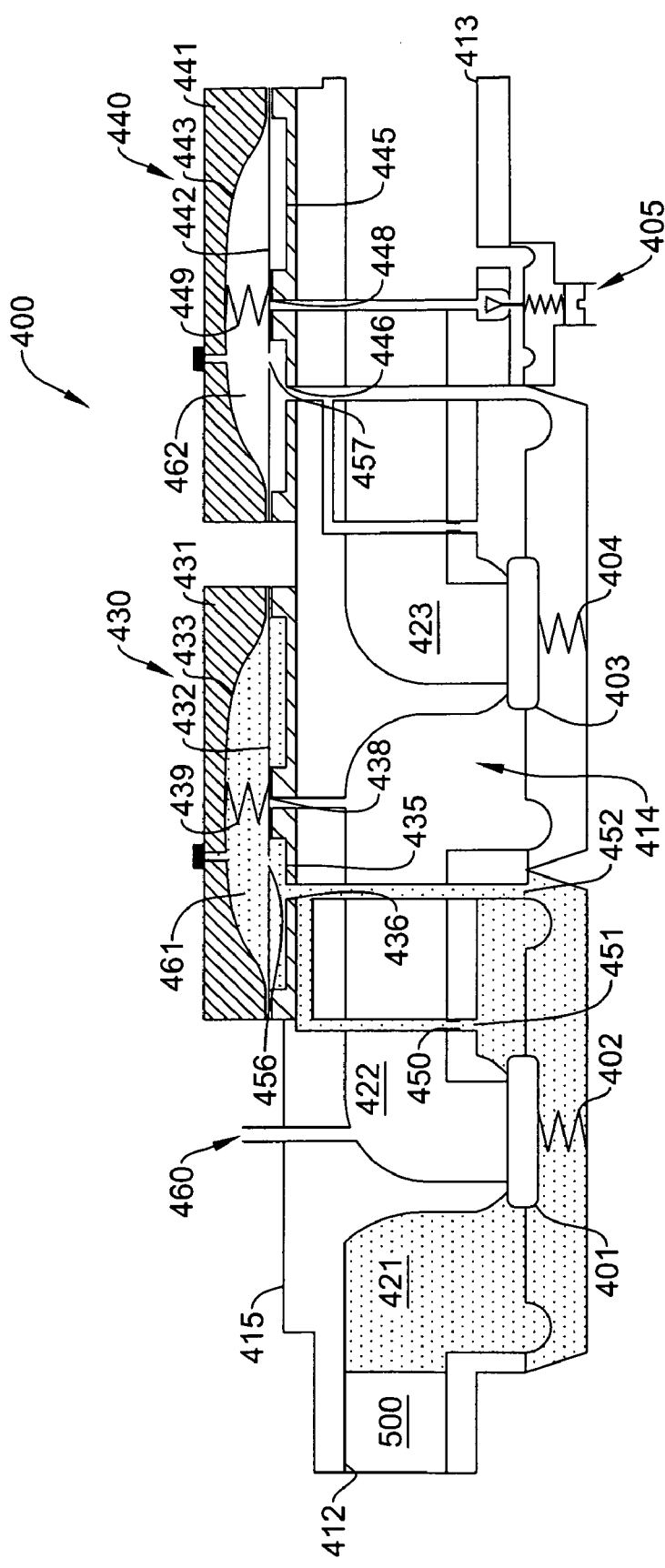
FIG. 11A is a schematic cross-sectional view of a further illustrative embodiment of a gas valve with both electrostatic gas valves closed.

FIG. 11A is a schematic cross-sectional view of another illustrative embodiment of a gas valve 400. The gas valve 400 includes a valve body 415 that has a gas inlet 412, a gas outlet 413, and a conduit 414 connecting the gas inlet 412 and gas outlet 413. The conduit 414 can include any number of flow chambers, as desired. In the illustrative embodiment, the conduit 414 includes a first flow chamber 421, a second flow chamber 422, and a third flow chamber 423. The first flow chamber 421 can be in fluid connection with the gas inlet 412. The third flow chamber 423 can be in fluid connection with the gas outlet 413. The second flow chamber 422 can be in selective fluid connection with both the first flow chamber 421 and the third flow chamber 423, as further described below.

A first main valve 401 can be disposed between the first flow chamber 421 and the second flow chamber 422. In the illustrative embodiment shown, the first main valve 401 is a diaphragm valve with a resilient spring 402 causing the first main valve 401 to be a normally closed valve. A second main valve 403 can be disposed between the second flow chamber 422 and the third flow chamber 423. In the illustrative embodiment shown, the second main valve 403 is a diaphragm valve with a resilient spring 404 causing the second main valve 403 to be a normally closed valve. In some embodiments, the first and second main valves 401 and 403 can be controlled by a first electrostatic diaphragm valve 430 and/or a second electrostatic diaphragm valve 440.

In the illustrative embodiment, a first electrostatic diaphragm valve 430 is disposed between the first flow chamber 421 and the second flow chamber 422, as shown. In the illustrative embodiment shown, the first electrostatic diaphragm valve 430 is a diaphragm valve with a resilient bias member or spring 439 causing the first electrostatic diaphragm valve 430 to be a normally closed valve. However, a separate resilient bias member or spring 439 is not required in all embodiments. For example, and in some embodiments, the diaphragm itself may have elastic restoring forces sufficient to close the valve.

A second electrostatic diaphragm valve 440 can be disposed between the second flow chamber 422 and the third flow chamber 423. In the illustrative embodiment, the second electrostatic diaphragm valve 440 is a diaphragm valve with a resilient bias member or spring 449 causing the second electrostatic diaphragm valve 440 to be a normally closed valve. Again, resilient bias member or spring 449 is not required in all embodiments.

The illustrative first electrostatic diaphragm valve 430 includes a body 431 with a first opposing wall 435 and a second opposing wall 433 that define a valve chamber 461. A first inlet port 436 extends into the valve chamber 461, as shown. The first inlet port 436 extends through the first opposing wall 435. The first inlet port 436 is in fluid communication with the first flow chamber 421 at a first flow opening 451. An outlet port 438 extends from the valve chamber 461, in some embodiments, through the first opposing wall 435. The inlet port 436 and the outlet port 438 can have any useful dimension. In one illustrative embodiment, the inlet port 436 and the outlet port 438 have a diameter of about 0.5 to 2 mm.

A diaphragm 432 is positioned within the valve chamber 461. In the illustrative embodiment, the diaphragm 432 extends generally along the first opposing wall 435 in an un-activated state, as shown. Diaphragm 432 can include one or more electrodes. The electrode(s) can extend near the edges of the valve chamber 461, and in some embodiments, can extend outside of the chamber 461. The second opposing wall 433 can include one or more stationary electrodes. The second opposing wall 433 and the diaphragm 432 can be configured so that, in the un-activated state, the separation distance between the stationary electrode(s) and the electrode(s) on the diaphragm 432 is smaller near the edges of the valve chamber 461. This may help draw the diaphragm 432 toward the second opposing wall 433 in a rolling action when a voltage is applied between the stationary electrode on the opposing wall 433 and the electrode on the diaphragm 432. Such a rolling action may help improve the efficiency and reduce the voltage requirements of the electrostatic valve.

The diaphragm 432 can have any useful dimensions. In one embodiment, the diaphragm 432 has a diameter from 15 to 30 mm. The diaphragm 432 can also have any useful displacement (greatest linear distance between the first opposing wall 435 and the second opposing wall 433). In one embodiment, the diaphragm has a displacement of from about 100 to 200 micrometers.

In some embodiments, the diaphragm 432 can include an orifice or aperture 456 that extends or is disposed through the diaphragm 432. This orifice or aperture 456 can allow pressure equalization across the diaphragm 432 until the orifice or aperture 456 is sealed by the second opposing wall 433. The orifice 456 can have any useful dimension. In one embodiment, the orifice 456 has a diameter of about 0.5 to 2 mm.

For purposes of illustration, the first opposing wall 435 is shown to be generally flat and with a raised portion adjacent the outlet 438. However, the first opposing wall 435 may assume other shapes, depending upon the application. For example, the first opposing wall 435 may have different regions that are recessed or protrude against the diaphragm 432 in order to, for example, prevent the diaphragm 432 from achieving a suction lock and/or stiction against the first opposing wall 435, or to improve the capabilities of the electrostatic valve 430. Other shapes may also be used, including curved shapes, planar shapes, and a combination of curved and planar shapes, as desired. Although the second opposing wall 433 is shown to be generally curved, other shapes may be used, depending on the application.

The body 431 may be made from any suitable semi-rigid or rigid material, such as plastic, ceramic, silicon, etc. In some embodiments, the body 431 is constructed by molding a high temperature plastic such as ULTEM™ (available from General Electric Company, Pittsfield, Mass.), CELAZOLE™ (available from Hoechst-Celanese Corporation, Summit, N.J.), KETRON™ (available from Polymer Corporation, Reading, Pa.), or some other suitable material.

The diaphragm 432 may be made from any suitable material. In some illustrative embodiments, the diaphragm 432 includes a material that has an elastic, resilient, flexible and/or other elastomeric property. In one illustrative embodiment, the diaphragm 432 is made from a polymer such as KAPTON™ (available from E. I. du Pont de Nemours & Co., Wilmington, Del.), KALADEX™ (available from ICI Films, Wilmington, Del.), MYLAR™ (available from E. I. du Pont de Nemours & Co., Wilmington, Del.), or any other suitable material.

The electrode secured to the diaphragm 432 can be provided, for example, by patterning a conductive coating on the diaphragm 432. For example, the diaphragm 432 electrode may be formed by printing, plating or deposition of metal or other conductive material. In some cases, the electrode layer may be patterned using a dry film resist, as is known in the art. The same or similar techniques may be used to provide the stationary electrode on the second opposing wall 433 of the body 431. Rather than providing a separate electrode layer, it is contemplated that the diaphragm 432 and/or second opposing wall 433 may be made conductive so as to function as an electrode, if desired.

A dielectric, such as a low temperature organic and inorganic dielectric, may be used as an insulator between the diaphragm 432 electrode and the stationary electrode on the opposing wall 433. The dielectric may be coated over the diaphragm 432 electrode, the stationary electrode on the opposing wall 433, or both. An advantage of using a polymer based substrate and/or diaphragm is that the resulting electrostatic valve may be made cheaper and lighter, and/or suitable for small handheld, or even suitable for disposable or reusable applications.

The illustrative second electrostatic diaphragm valve 440 includes a body 441 with a first opposing wall 445 and a second opposing wall 443 that define a valve chamber 462. An inlet port 446 extends into the valve chamber 462, as shown. The inlet port 446 extends through the first opposing wall 445. The inlet port 446 is in selective fluid connection with the first electrostatic valve 430 via the first electrostatic valve 430 outlet 438. An outlet port 448 extends from the valve chamber 462, in some embodiments, through the first opposing wall 445. The inlet port 446 and the outlet port 448 can have any useful dimension. In one embodiment, the inlet port 446 and the outlet port 448 have a diameter of about 0.5 to 2 mm.

An elastic diaphragm 442 is positioned within the valve chamber 462. In the illustrative embodiment, the elastic diaphragm extends generally along the first opposing wall 445 in an un-activated state, as shown. Diaphragm 442 can include one or more electrodes. The electrode(s) can extend near the edges of the valve chamber 462, and in some embodiments, can extend outside of the chamber 462. The second opposing wall 443 can include one or more stationary electrodes. The second opposing wall 443 and the diaphragm 442 can be configured so that, in the un-activated state, the separation distance between the stationary electrode(s) on the second opposing wall 443 and the electrode(s) on the diaphragm 442 is smaller near the edges of the valve chamber 461. This may help draw the diaphragm 442 toward the second opposing wall 443 in a rolling action when a voltage is applied between the stationary electrode(s) on the opposing wall 443 and the electrode(s) on the diaphragm 442. Such a rolling action may help improve the efficiency and reduce the voltage requirements of the electrostatic valve.

The diaphragm 442 can have any useful dimensions. In one embodiment, the diaphragm 442 has a diameter from 15 to 30 mm. The diaphragm 442 can also have any useful displacement (greatest linear distance between the first opposing wall 445 and the second opposing wall 443.) In one embodiment, the diaphragm 442 has a displacement of from about 100 to 200 micrometers.

In some embodiments, the diaphragm 442 includes an orifice or aperture 457 that extends or is disposed through the diaphragm 442. This orifice or aperture 457 can allow pressure equalization across the diaphragm 442 until the orifice or aperture 457 is sealed by the second opposing wall 443. The orifice 457 can have any useful dimension. In one embodiment, the orifice 457 has a diameter of about 0.5 to 2 mm.

For purposes of illustration, the first opposing wall 445 is shown to be generally flat and with a raised portion adjacent the outlet 448. However, the first opposing wall 445 may assume other shapes, depending upon the application. For example, the first opposing wall 445 may have different regions that are recessed or protrude against the diaphragm 442 in order to, for example, prevent the diaphragm 442 from achieving a suction lock and/or stiction against the first opposing wall 445, or to improve the capabilities of the electrostatic valve 440. Other shapes may also be used, including curved shapes, planar shapes, or a combination of curved and planar shapes, as desired. Although the second opposing wall 443 is shown to be generally curved, other shapes may be used, depending on the application.

The body 441, diaphragm 442, and electrodes for the second electrostatic valve 440 can be similar to the body 431, diaphragm 432 and electrodes for the first electrostatic valve 430 described above.

An optional pilot outlet 460 can extend from the gas valve 400. In one illustrative embodiment, the pilot outlet 460 can extend from the second flow chamber 422. Also, an optional regulator 405 can be disposed between the gas outlet 413 and the second electrostatic valve 440 outlet port 448.

FIG. 11A illustrates gas intrusion into the gas valve 400 when both electrostatic valves 430 and 440 are in a closed position. As shown, gas flows into the gas inlet 412, into the first flow opening 451. In the illustrative embodiment, the first flow opening 451 is in fluid connection with the inlet port 436. Gas can flow through the inlet port 436 onto the valve chamber 461.

Figure 12:
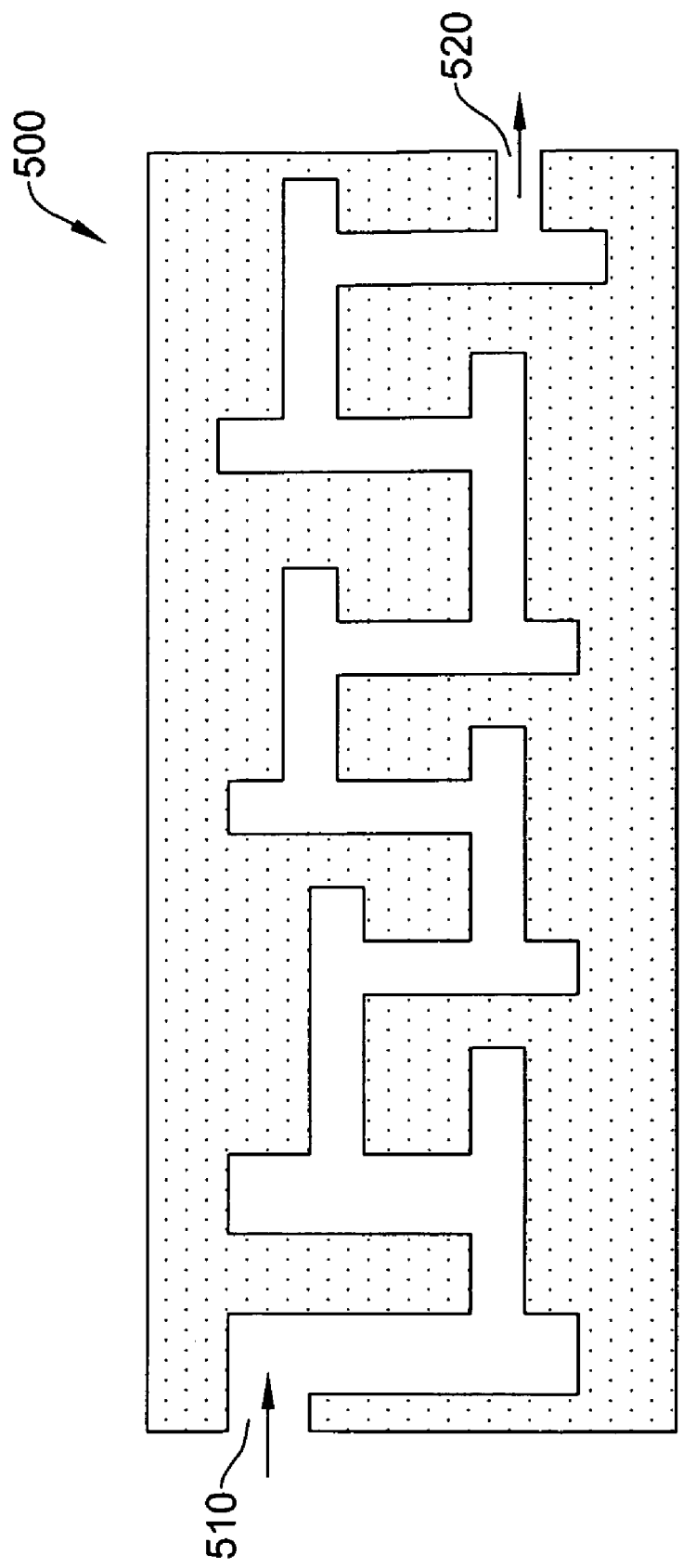
FIG. 12 is a schematic cross-sectional view of an illustrative trap.

An optional trap 500 is shown positioned in gas inlet 412. In other embodiments, the trap 500 is located anywhere in the gas flow path upstream of the electrostatic diaphragm valves described herein. In some embodiments, the trap 500 removes particulate matter, water vapor, or other gas vapors such as, for example, glycol vapor, that can be harmful to the electrostatic valves downstream of the trap 500. One embodiment of the trap 500 is shown in FIG. 12 and described below.

A restrictor 450 is shown disposed between the first flow opening 451 and the first inlet port 436. The restrictor 450 can have any useful dimension such as, for example, a diameter of 0.1 to 0.5 mm. Gas can also flow through the restrictor 450 to a backside of the first main valve 401 through a first backside flow opening 452. The restrictor 450 can limit the flow of gas to the backside of the first main valve 401 through a first backside flow opening 452. By limiting the flow of gas through the first backside flow opening 452, the restrictor 450 can limit the gas pressure on the backside of the first main valve 401 to less than the gas pressure in the first flow chamber 421. This may tend to open the first main valve 401

Figure 11B:
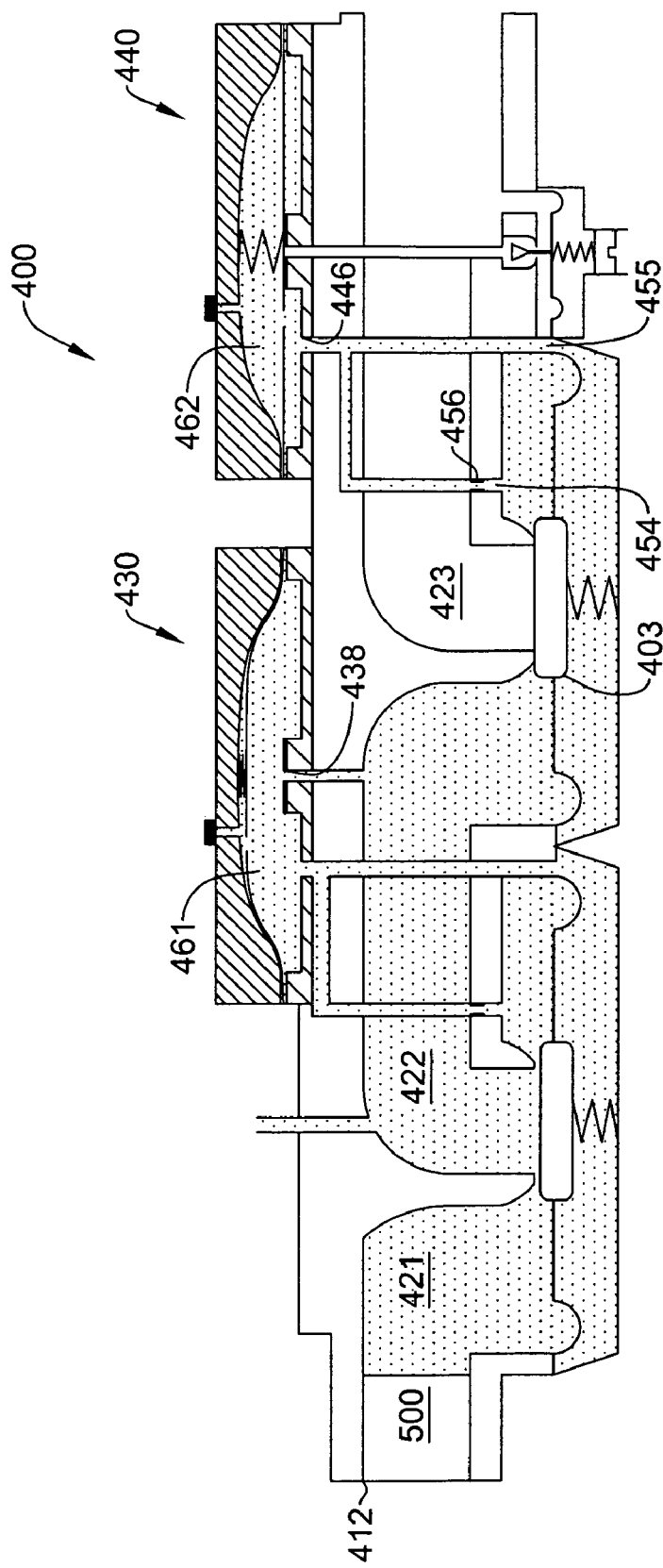
FIG. 11B is a schematic cross-sectional view of the illustrative gas valve shown in FIG. 11A with one electrostatic gas valve closed.

FIG. 11B is a schematic cross-sectional view of the illustrative gas valve shown in FIG. 11A with the first electrostatic valve 430 open and the second electrostatic gas valve 440 closed. As shown, gas flows from the chamber 461 of the first electrostatic valve through the first electrostatic valve 430 gas outlet port 438, through the second flow chamber 422, into the second flow opening 454, into the second electrostatic valve 440 inlet port 446 and into the second electrostatic valve 440 chamber 462. Gas can also flow from the inlet port 446 to the backside of the second main valve 403 via a second backside flow opening 455.

A restrictor 456 is shown disposed between the second flow opening 454 and the inlet port 446. The restrictor 456 can have any useful dimension such as, for example, 0.1 to 0.5 $mm^2$. Gas can also flow through the restrictor 456 to a backside of the second main valve 403 through a second backside flow opening 455. The restrictor 456 can limit the flow of gas to the backside of the second main valve 403 through a second backside flow opening 455. By limiting the flow of gas through the second backside flow opening 455, the restrictor 456 can limit the gas pressure on the backside of the second main valve 403 to less than the gas pressure in the second flow chamber 422. This may tend to open the second main valve 403.

Figure 11C:
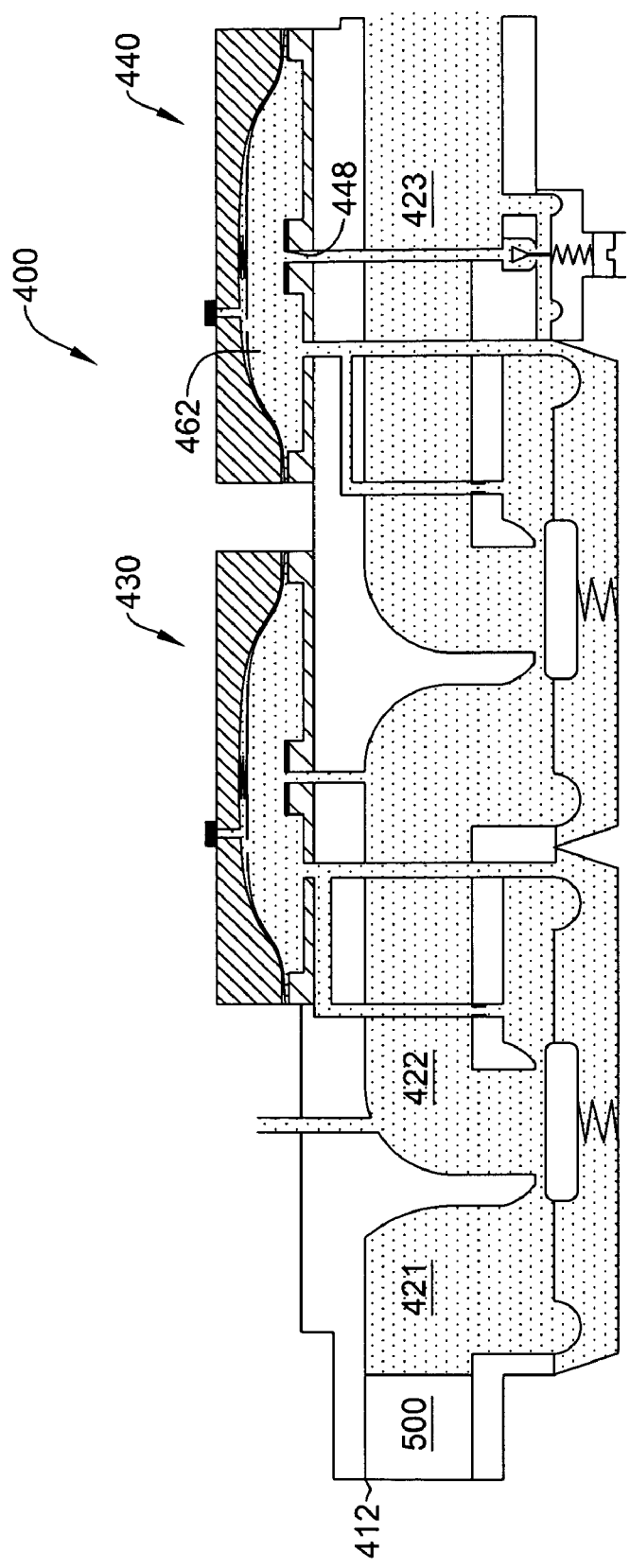
FIG. 11C is a schematic cross-sectional view of the illustrative gas valve shown is FIG. 11B with both electrostatic gas valves open.

FIG. 11C is a schematic cross-sectional view of the illustrative gas valve shown in FIG. 11B with both electrostatic gas valves 430 and 440 open. As shown, gas flows from the second electrostatic valve 440 chamber 462 into the third flow chamber 423 via the outlet port 448. As gas flow increases though the gas valve 400, the first and second main valves 401 and 403 respond by opening accordingly.

FIG. 12 is a schematic cross-sectional view of an illustrative trap 500. In one embodiment, the trap 500 is positioned in the gas flow path ahead of the electrostatic diaphragm valves. The trap 500 includes a trap inlet 510 and a trap outlet 520. In the embodiment shown, a series of intersecting orthogonal gas flow channels are disposed between the trap inlet 510 and a trap outlet 520 providing a gas flow path from the trap inlet 510 to the trap outlet 520. In one embodiments, the intersecting orthogonal gas flow channels decrease in cross-sectional area.

Electrostatic diaphragm valves described herein can be operated as either an on/off valve or a regulating or modulating valve where the diaphragm can operate at any position between a first closed position and a second open position. An air spring, regulator, pilot outlet, and one or more pressure sensors may or may not be included in the gas valve embodiments of the invention, as desired. Also, while similar first and second electrostatic diaphragm valves are shown in the Figures, the first electrostatic valve can be different than the second electrostatic diaphragm valve. In other embodiments, the valve can include at least one electrostatic diaphragm valve and at least one traditional electromagnetic valve.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A gas valve comprising:
   a valve body comprising a gas inlet, a gas outlet, and a conduit connecting the gas inlet and the gas outlet, the conduit comprising a first flow chamber, a second flow chamber and a third flow chamber;
   a first electrostatic diaphragm pilot valve disposed between the first flow chamber and the second flow chamber; and
   a second electrostatic diaphragm pilot valve disposed between the second flow chamber and the third flow chamber.

2. A gas valve according to claim 1 wherein the first electrostatic diaphragm pilot valve comprises:
   a body forming a first diaphragm valve chamber, the first diaphragm valve chamber having a first opposing wall and a second opposing wall;
   a diaphragm mounted between the first opposing wall and the second opposing wall, the diaphragm assuming a first position adjacent the first opposing wall when no external force is applied;
   a first electrode secured to the second opposing wall; and
   a second electrode secured to the diaphragm;
   wherein, the diaphragm is electrostatically pulled toward the second opposing wall when a voltage is applied between the first electrode and the second electrode.

3. A gas valve according to claim 2 further comprising:
   an inlet port in fluid communication with the first flow chamber and the first diaphragm valve chamber; and
   an outlet port in fluid communication with the first diaphragm valve chamber and the second flow chamber when the diaphragm is electrostatically pulled toward the second opposing wall by a voltage applied between the first electrode and the second electrode.

4. A gas valve according to claim 2 further comprising:
   an inlet port in fluid communication with the first flow chamber and the first diaphragm valve chamber; and
   an outlet port in fluid communication with the first diaphragm valve chamber and the second diaphragm valve chamber when the diaphragm is electrostatically pulled toward the second opposing wall by a voltage applied between the first electrode and the second electrode.

5. A gas valve according to claim 3 wherein the inlet port is disposed through the first opposing wall.

6. A gas valve according to claim 4 wherein the inlet port is disposed through the second opposing wall.

7. A gas valve according to claim 4 further comprising a second inlet port in fluid communication with the first flow chamber and the first diaphragm valve chamber, wherein the inlet is disposed though the first opposing wall and the second inlet is disposed through the second opposing wall.

8. A gas valve according to claim 2 wherein the first opposing wall and the second opposing wall are configured such that a spacing between the first opposing wall and the second opposing wall is smaller near the edge of the first diaphragm valve chamber than near the center of the first diaphragm valve chamber.

9. A gas valve according to claim 1 further comprising a bias member disposed between the diaphragm and the second opposing wall.

10. A gas valve according to claim 2 further comprising an aperture disposed through the diaphragm.

11. A gas valve according to claim 10 wherein the aperture is disposed adjacent the second opposing wall as the diaphragm is electrostatically pulled toward the second opposing wall.

12. A gas valve according to claim 2 wherein the second electrostatic diaphragm pilot valve comprises:
   a body forming a second diaphragm valve chamber, the second diaphragm valve chamber having a first opposing wall and a second opposing wall;
   a diaphragm mounted between the first opposing wall and the second opposing wall, the diaphragm assuming a first position adjacent the first opposing wall when no external force is applied;
   a first electrode secured to the second opposing wall; and
   a second electrode secured to the diaphragm;
   wherein, the diaphragm is electrostatically pulled toward the second opposing wall when a voltage is applied between the first electrode and the second electrode.

13. A gas valve according to claim 12 further comprising:
   an inlet port in fluid communication with the second flow chamber and the second diaphragm valve chamber; and
   an outlet port in fluid communication with the second diaphragm valve chamber and the third flow chamber when the diaphragm is electrostatically pulled toward the second opposing wall by a voltage applied between the first electrode and the second electrode.

14. A gas valve according to claim 12 further comprising:
- an inlet port in fluid communication with the first diaphragm valve chamber and the second diaphragm valve chamber; and
- an outlet port in fluid communication with the second diaphragm valve chamber and the third flow chamber only when the diaphragm is electrostatically pulled toward the second opposing wall by a voltage applied between the first electrode and the second electrode.

15. A gas valve according to claim 13 wherein the inlet port is disposed through the first opposing wall.

16. A gas valve according to claim 14 wherein the inlet port is disposed through the first opposing wall.

17. A gas valve according to claim 14 further comprising a second inlet port in fluid communication with the second flow chamber and the second diaphragm valve chamber, wherein the inlet is disposed though the first opposing wall and the second inlet is disposed through the second opposing wall.

18. A gas valve according to claim 12 wherein the first opposing wall and the second opposing wall are configured such that a spacing between the first opposing wall and the second opposing wall is smaller near the edge of the second diaphragm valve chamber than near the center of the second diaphragm valve chamber.

19. A gas valve according to claim 12 further comprising a bias member disposed between the diaphragm and the second opposing wall.

20. A gas valve according to claim 12 further comprising an aperture disposed through the diaphragm.

21. A gas valve according to claim 1 wherein the valve body further comprises an electrostatic diaphragm pressure sensor in fluid communication with the gas outlet.

22. A gas valve according to claim 1 wherein the valve body further comprises a particulate matter trap in fluid communication with the first or second electrostatic valve.

23. A gas valve comprising:
- a valve body comprising a gas inlet, a gas outlet, and a conduit connecting the gas inlet and the gas outlet, the conduit comprising a first flow chamber, a second flow chamber and a third flow chamber;
- a first electrostatic diaphragm valve disposed between the first flow chamber and the second flow chamber;
- a second electrostatic diaphragm valve disposed between the second flow chamber and the third flow chamber; and
- a pressure sensor in fluid communication with the gas outlet.

24. A gas valve according to claim 23 wherein the pressure sensor is a diaphragm type pressure sensor having a diaphragm forming a pressure chamber with an opposing wall, the diaphragm having a diaphragm electrode and the opposing wall having an opposing wall electrode.

25. A gas valve according to claim 23 wherein the diaphragm electrode and the opposing wall electrode are coupled to a controller, and wherein the controller is adapted to determine a measure of capacitance between the diaphragm electrode and the opposing wall electrode.

26. A gas valve according to claim 25 wherein the diaphragm of the pressure sensor deflects toward the opposing wall when a pressure is applied via the gas outlet, which changes the capacitance between the diaphragm electrode and the opposing wall electrode.

27. A gas valve according to claim 26 wherein the opposing wall has a curved shape.

28. A gas valve according to claim 26 wherein the opposing wall has a linear shape.

29. A gas valve according to claim 26 wherein the opposing wall has a compound linear shape.

30. A gas valve according to claim 26 wherein the opposing wall has a shape that provides a relatively linear relationship between an applied pressure via the gas outlet and the capacitance between the diaphragm electrode and the opposing wall electrode.

31. A gas valve according to claim 26 wherein the pressure sensor includes two or more pressure sensors, each having a different pressure versus capacitance curve.

32. A gas valve according to claim 31 wherein at least one of the pressure sensors has a measuring pressure range different from that of another one of the pressure sensors.

33. A gas valve according to claim 23 wherein the valve body further comprises a particulate matter trap in fluid communication with the first or second electrostatic valve.

34. A gas valve comprising:
- a first flow chamber;
- a second flow chamber;
- a first main valve positioned between the first flow chamber and the second flow chamber, wherein the first main valve is opened by a pressure differential across the first main valve;
- a first electrostatically controlled valve for controlling the pressure differential across the first main valve;
- a third flow chamber;
- a second main valve positioned between the second flow chamber and the third flow chamber, wherein the second main valve is opened by a pressure differential across the second main valve; and
- a second electrostatically controlled valve for controlling the pressure differential across the second main valve.

35. The gas valve of claim 34 wherein the second electrostatically controlled valve is in fluid communication with the first electrostatically controlled valve.

36. The gas valve of claim 34 wherein the first electrostatically controlled valve is adapted to control the pressure differential across the first main valve along a range of pressure differential values.

37. The gas valve of claim 34 wherein the second electrostatically controlled valve is adapted to control the pressure differential across the second main valve along a range of pressure differential values.

38. A gas valve according to claim 34 wherein the gas valve further comprises a particulate matter trap in fluid communication with the first electrostatic valve.

39. A gas valve comprising:
- a first flow chamber;
- a second flow chamber;
- a main valve positioned between the first flow chamber and the second flow chamber, wherein the first main valve is opened by a pressure differential across the first main valve; and
- an electrostatic valve for controlling the pressure differential across the main valve, the electrostatic valve comprising:
  - a body forming a first diaphragm valve chamber, the first diaphragm valve chamber having a first opposing wall and a second opposing wall;

a diaphragm mounted between the first opposing wall and the second opposing wall, the diaphragm assuming a first position adjacent the first opposing wall when no external force is applied;

a first electrode secured to the second opposing wall; and a second electrode secured to the diaphragm;

wherein, the diaphragm is electrostatically pulled toward the second opposing wall when a voltage is applied between the first electrode and the second electrode.

* * * * *